(12) United States Patent
Beiderman et al.

(10) Patent No.: US 12,067,355 B2
(45) Date of Patent: *Aug. 20, 2024

(54) SYSTEM AND METHOD FOR CREATING CUSTOMIZED INSURANCE-RELATED FORMS USING COMPUTING DEVICES

(71) Applicant: Insurance Services Office, Inc., Jersey City, NJ (US)

(72) Inventors: Ronald Beiderman, East Brunswick, NJ (US); John Scerbo, Basking Ridge, NJ (US); Michael E. Goodside, Jersey City, NJ (US); Ka Man Chan, Stewartsville, NJ (US); Mark Peterson, Hobken, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,902

(22) Filed: Jul. 20, 2021

(65) Prior Publication Data

US 2021/0350067 A1 Nov. 11, 2021

Related U.S. Application Data

(63) Continuation of application No. 15/085,795, filed on Mar. 30, 2016, now Pat. No. 11,068,644.

(Continued)

(51) Int. Cl.
*G06F 40/174* (2020.01)
*G06F 16/23* (2019.01)
(Continued)

(52) U.S. Cl.
CPC ........ *G06F 40/174* (2020.01); *G06F 16/2358* (2019.01); *G06F 16/24573* (2019.01);
(Continued)

(58) Field of Classification Search
None
See application file for complete search history.

(56) References Cited

U.S. PATENT DOCUMENTS 6,067,531 A    5/2000  Hoyt et al.
7,080,076 B1 *  7/2006  Williamson .......... G06F 40/166
                                                709/200

(Continued)

OTHER PUBLICATIONS

Office Action mailed Jul. 25, 2017, issued in connection with U.S. Appl. No. 15/085,795 (22 pages).

(Continued)

*Primary Examiner* — Ariel Mercado-Vargas
(74) *Attorney, Agent, or Firm* — McCarter & English, LLP

(57) ABSTRACT

A system and method for creating customized insurance-related forms (e.g., agreements, policies, exceptions, and other insurance-related documents) using computing devices is disclosed. A user can quickly and conveniently create customized insurance-related forms, and can transmit same to one or more remote users and/or computing systems for further processing. The system provides rich tagged searching and editing features for allowing an insurance professional to rapidly create customized forms, and to access other forms while editing a given form. The system ingests and decomposes insurance-related forms into clauses, applies search tags to the clauses, and stores the clauses and the search tags in a database for rapid searching and retrieval of desired tags for use in creating customized forms.

24 Claims, 56 Drawing Sheets

Related U.S. Application Data

(60) Provisional application No. 62/140,234, filed on Mar. 30, 2015.

(51) Int. Cl.
*G06F 16/2457* (2019.01)
*G06F 16/248* (2019.01)
*G06F 40/117* (2020.01)
*G06Q 40/08* (2012.01)

(52) U.S. Cl.
CPC ...... *G06F 16/24575* (2019.01); *G06F 16/248* (2019.01); *G06F 40/117* (2020.01); *G06Q 40/08* (2013.01)

(56) References Cited

U.S. PATENT DOCUMENTS

| | | | |
|---|---|---|---|
| 7,496,577 | B2 | 2/2009 | Williamson et al. |
| 8,275,781 | B2* | 9/2012 | Fume ............... G06F 16/93 |
| | | | 715/256 |
| 8,966,362 | B2* | 2/2015 | Smetters ............... G06F 40/117 |
| | | | 715/255 |
| 11,068,644 | B1 | 7/2021 | Beiderman et al. |
| 2002/0188603 | A1 | 12/2002 | Baird et al. |
| 2006/0136438 | A1* | 6/2006 | McChrystal ............ G06F 16/93 |
| 2006/0259475 | A1* | 11/2006 | Dehlinger ............... G06F 16/93 |
| 2007/0233692 | A1* | 10/2007 | Lisa ...................... G06F 40/166 |
| 2008/0059365 | A1* | 3/2008 | Lee ...................... G06Q 10/10 |
| | | | 705/38 |
| 2008/0306784 | A1 | 12/2008 | Rajkumar et al. |
| 2011/0191098 | A1* | 8/2011 | Thomas ................ G06F 40/237 |
| | | | 704/9 |
| 2012/0005626 | A1 | 1/2012 | Wong et al. |
| 2012/0127082 | A1 | 5/2012 | Kushler et al. |
| 2012/0296746 | A1 | 11/2012 | Bleadall et al. |
| 2013/0006957 | A1 | 1/2013 | Huang et al. |
| 2013/0019164 | A1* | 1/2013 | Whetsell ............... G06F 40/258 |
| | | | 715/243 |
| 2013/0036348 | A1* | 2/2013 | Hazard ................. G06F 40/131 |
| | | | 715/230 |
| 2013/0151533 | A1 | 6/2013 | Udupa et al. |
| 2014/0025608 | A1* | 1/2014 | Miller .................. G06F 40/186 |
| | | | 706/12 |
| 2016/0070762 | A1 | 3/2016 | Nicholls et al. |
| 2016/0269453 | A1* | 9/2016 | Redniss ............. H04L 12/1818 |
| 2017/0220680 | A1 | 8/2017 | Shattuck |

OTHER PUBLICATIONS

Office Action mailed May 4, 2018, issued in connection with U.S. Appl. No. 15/085,795 (31 pages).
Office Action mailed Nov. 19, 2018, issued in connection with U.S. Appl. No. 15/085,795 (25 pages).
Office Action mailed Jun. 3, 2019, issued in connection with U.S. Appl. No. 15/085,795 (28 pages).
Office Action mailed Dec. 20, 2019, issued in connection with U.S. Appl. No. 15/085,795 (28 pages).
Office Action mailed Sep. 21, 2020, issued in connection with U.S. Appl. No. 15/085,795 (28 pages).
Notice of Allowance mailed Apr. 12, 2021, issued in connection with U.S. Appl. No. 15/085,795 (5 pages).

* cited by examiner

120

| | iOS Simulator – ipad / iOS 7.1 (11D167) | |
|---|---|---|
| Carrier 🔍 💾 🖨 ✉ 📁 + | 11:00am | 100% ≡ |

122

124 — Insuring Agreements  Exclusion  Supplementary Payments

Edit  Match  Select  Reset

126

COMMERCIAL GENERAL LIABILIY COVERAGE FORM

Various provisions in this policy restrict coverage. Read the entire policy carefully to determine rights, duties and what is and is not covered.

Throughout this policy the words "you" and "your" refer to the Named Insured shown in the Declarations and any other person or organization qualifying as a Named Insured under this policy. The words "we" "us" and "our" refer to the company providing this insurance.

The word "insured" means any person or organization qualifying as such under Section II- Who Is An Insured.

Other words and phrases that appear in quotation marks have special meaning. Refer to Section-V-Definitions

SECTION I – COVERAGES

COVERAGE A – BODILY INJURY AND PROPERTY DAMAGE LIABILITY

1. Insuring Agreement
   a. We will pay those sums that the insured becomes legally obligated to pay as damages because of "bodily injury" or "property damage" to which this insurance applies. We will have the right and duty to defend the insured against any "suit" seeking those damages. However, we will have no duty to defend the insured against any "suit" seeking damages for "bodily injury" or "property damage" to which this insurance does not apply. We may, at our own discretion, investigate any "occurrence" and settle any claim or "suit" that may result. But:
      1) The amount we will pay for damages is limited as described in Section III – Limits Of Insurance; and
      2) Our right and duty to defend ends when we have used up the applicable limit of insurance in the payment of judgments or settlements under Coverages A or B or medical expenses under Coverage C.
      No other obligation or liability to pay sums or perform acts or services is covered unless explicitly provided for under Supplementary Payments – Coverages A and B.
   b. This insurance applies to "bodily injury" and "property damage" only if,
      1) The "bodily injury" or "property damage" is caused by an "occurrence" that takes place in the "coverage territory",
      2) The "bodily injury" or "property damage" occurs during the policy period, and
      3) Prior to the policy period, no insured listed under Paragraph 1. of Section II – Who Is An Insured and no "employee" authorized by you to give or receive notice of an "occurrence" or claim, knew the "bodily injury" or "property damage" had occurred, in whole or in part. If such a listed insured or authorized "employee" knew, prior to the policy period, that the "bodily injury" or "property damage" occurred, then any continuation, change, or resumption of such "bodily injury" or "property damage" during or after the policy period will be deemed to have known prior to the policy period.
   c. "Bodily injury" or "property damage" which occurs during the policy period and was not prior to the policy period, known to have occurred by any insured listed under Paragraph 1. Section II – Who Is An Insured or any "employee" authorized by you to give or receive notice of an "occurrence" or claim, includes any continuation, change, or resumption of that "bodily injury" or "property damage" after the end of the policy period.
   d. "Bodily injury" or "property damage" will be deemed to have been known to have occurred at the earliest time when any insured listed under Paragraph 1. of Section II – Who Is An Insured or any "employee" authorized by you to give or receive notice of an ""occurrence" or claim
      1) Reports all, or any part of the "bodily injury" or "property damage" to us or any other insurer
      2) Receives a written or verbal demand or claim for damages because of the "bodily injury" or "property damage" or
      3) Becomes aware by any other means that "bodily injury" or "property damage" has occurred or had begun to occur
   e. Damages because of "bodily injury" include damages claimed by any person or organization for care, loss of services, or death resulting at any time from the "bodily injury".

2. Exclusions
   This insurance does not apply to:
   a. Expected Or Intended Injury
      "Bodily injury" or "property damage" expected or intended from the standpoint of the insured. This exclusion does not

128 — 130 iOS Simulator – ipad / iOS 7.1 (11D167)

Carrier ≈      10:43am      100%

< Back

\+ — Color Undo Redo   B   I   U

COVERAGE A – BODILY INJURY AND PROPERTY DAMAGE LIABILITY

1. Insuring Agreement
   a. We will pay those sums that the insured becomes legally obligated to pay as damages because of "bodily injury" or "property damage" to which this insurance applies. We will have the right and duty to defend the insured against any "suit" seeking those damages. However, we will have no duty to defend the insured against any "suit" seeking damages for "bodily injury" or "property damage" to which this insurance does not apply. We may, at our own discretion, investigate any "occurrence" and settle any claim or "suit" that may result. But:
      1) The amount we will pay for damages is limited as described in Section III – Limits Of Insurance; and
      2) Our right and duty to defend ends when we have used up the applicable limit of insurance in the payment of judgments or settlements under Coverages A or B or medical expenses under Coverage C.
      No other obligation or liability to pay sums or perform acts or services is covered unless explicitly provided for under Supplementary Payments ⓐ Coverages A and B.
   b. This insurance applies to "bodily injury" and "property damage" only if,
      1) The "bodily injury" or "property damage" is caused by an "occurrence" that takes place in the "coverage territory",
      2) The "bodily injury" or "property damage" occurs during the policy period, and
      3) Prior to the policy period, no insured listed under Paragraph 1. of Section II – Who Is An Insured and no "employee" authorized by you to give or receive notice of an "occurrence" or claim, knew that the "bodily injury" or "property damage" had occurred, in whole or in part. If such a listed insured or authorized "employee" knew, prior to the policy period, that the "bodily injury" or "property damage" occurred, then any continuation, change, or resumption of such "bodily injury" or "property damage" during or after the policy period will be deemed to have known prior to the policy period.
   c. "Bodily injury" or "property damage" which occurs during the policy period and was not prior to the policy period, known to have occurred by any insured listed under Paragraph 1. Section II – Who Is An Insured or any "employee" authorized by you to give or receive notice of an "occurrence" or claim, includes any continuation, change, or resumption of that "bodily injury" or "property damage" after the end of the policy period.
   d. "Bodily injury" or "property damage" will be deemed to have been known to have occurred at the earliest time when any insured listed under Paragraph 1. of Section II – Who Is An Insured or any "employee" authorized by you to give or receive notice of an "occurrence" or claim;
      1) Reports all, or any part of the "bodily injury" or "property damage" to us or any other insurer
      2) Receives a written or verbal demand or claim for damages because of the "bodily injury" or "property damage" or
      3) Becomes aware by any other means that "bodily injury" or "property damage" has occurred or had begun to occur
   e. Damages because of "bodily injury" include damages claimed by any person or organization for care, loss of services, or death resulting at any time from the "bodily injury".

iOS Simulator — Ipad / IOS 7.1 (11D167)

| Carrier 🔋 | Existing Clause 10:27 | 100% ⟹ |
| --- | --- | --- |
| < Back | | |

| Tap Here to Apply | Add As Endorsement |
| --- | --- |

ABUSE OR MOLESTATION EXCLUSION

[The following Exclusion is added to paragraph 2., Exclusions of section I – coverage A Bodily injury and property
Damage Liability and Paragraph 2., Exclusions of Section I Coverage B Personal and Advertising Injury Liability:]
This insurance does not apply to "bodily injury". property damage" or "personal and advertising injury" arising out of:

1. The actual or threatened abuse or molestation by anyone of any person while in the care, custody or control of any insured or.
2. negligent
   a. Employment
   b. Investigation:
   c. Supervision
   d. Reporting to the proper authorities, or failure to so report or
   e. Retention of a person for whom any insured is or ever was legally responsible and whose conduct would be excluded by

```
┌─────────────────────────────────────────────────────────────┐
│              IOS Simulator – Ipad / IOS 7.1 (11D167)         │
├─────────────────────────────────────────────────────────────┤
│ Carrier ≈                  11:27am                    100% ▭│
│ < Back                                                       │
├─────────────────────────────────────────────────────────────┤
│                                                              │
│        Tap Here to Apply            Add as Endorsement       │
│                                                              │
├─────────────────────────────────────────────────────────────┤
```

TOTAL POLLUTION EXCLUSION WITH A BUILDING HEATING, COOLING, AND DEHUMIDIFYING EQUIPMENT EXCEPTION AND A HOSTILE FIRE EXCEPTION

[Exclusion f. under Paragraph 2. Exclusions of Section I - Coverage A - Bodily Injury and Property Damage Liability is replaced by the following]

This insurance does not apply to:

f. Pollution
   (1) "Bodily injury" or "property damage" which would not have occurred in whole or part but for the actual, alleged or threatened discharge, dispersal, seepage, migration, release, or escape of "pollutants" at any time.
   This exclusion does not apply to:
      (a) "Bodily injury" if sustained within a building which is or was at any time owned or occupied by, or rented or loaned to, an insured and caused by smoke, fumes, vapor, or soot produced by or originating from equipment that is used to heat, cool, or dehumidify the building, or equipment that is used to heat water for personal use by the building's occupants or their guests; or
      (b) "Bodily injury" or "property damage" arising out of heat, smoke, or fumes from a "hostile fire" unless that "hostile fire" occurred or originated:
         (i) At any premises, site, or location which is or was at any time used by or for any insured or others for the handling, storage, disposal, processing, or treatment of waste; or
         (ii) At any premises, site, or location on which any insured or any contractors or subcontractors working directly or indirectly on an insured's behalf are performing operations to test for, monitor, clean up, remove, contain, treat, detoxify, neutralize or in any way respond to, or assess the effects of "pollutants"
   (2) Any loss, cost, or expense arising out of any:
      (a) Request, demand, order or statutory or regulatory requirement that any insured or others test for, monitor, clean up, remove, contain, treat, detoxify, or neutralize, or in any way respond to, or assess the effects of "pollutants"
      (b) Claim or suit by or on behalf of a governmental authority for damages because of testing for, monitoring, cleaning up, removing, containing, treating, detoxifying, or neutralizing, or in any way responding to, or assessing the effects of "pollutants"

```
┌─────────────────────────────────────────────────────────────────┐
│           IOS Simulator  —  Ipad / IOS 7.1 (11D167)             │
├─────────────────────────────────────────────────────────────────┤
│ Carrier                       11:00am                    100%   │
│  🔍    💾    🖨    ✉    📁    +                          ≡       │
├─────────────────────────────────────────────────────────────────┤
│   Insuring Agreements      Exclusion     Supplementary Payments │
├─────────────────────────────────────────────────────────────────┤
│   Edit     Match     Select                              Reset  │
└─────────────────────────────────────────────────────────────────┘
```

Figure 15

"Bodily Injury" to (1) An "employee" of the insured arising out of and in the course of
      (a) Employment by the insured; or
      (b) Performing duties related to the conduct of the insured's business; or
   (2) The spouse, child, parent, brother or sister of that "employee" as a consequence of Paragraph (1) above.

This exclusion applies whether the insured may be liable as an employer or in any other capacity and to an obligation to share damages with or repay someone else who must pay damages because of the injury.

This exclusion does not apply to liability assumed by the insured under an "insured contract".

f. Pollution
   (1) "Bodily injury" or "property damage" which would not have occurred in whole or part but for the actual, alleged or threatened discharge, dispersal, seepage, migration, release, or escape of "pollutants" at any time.
      This exclusion does not apply to
      (a) "Bodily injury" if sustained within a building which is or was at any time owned or occupied by, or rented or loaned to, an insured and caused by smoke, fumes, vapor, or soot produced by or originating from equipment that is used to heat, cool, or dehumidify the building, or equipment that is used to heat water for personal use by the buildings occupants or their guest; or
      (b) "Bodily injury" or "property damage" arising out of heat, smoke, or fumes from a "hostile fire" unless that "hostile fire" occurred or originated;
         (i) At any premises, site, or location which is or was at any time used by or for any insured or others for the handling, storage, disposal, processing, or treatment of waste; or
         (ii) At any premises, site, or location on which any insured or any contactors or subcontractors working directly or indirectly on an insured's behalf are preforming operations to test for, monitor, clean up, remove, contain, treat, detoxify, neutralize or in any way respond to, or assess the effects of "pollutants"
   (2) Any loss, cost, or expense arising out of any
      (a) Request, demand, order or statutory or regulatory requirement that any insured or others test for, monitor, clean up, remove, contain, treat, detoxify, or neutralize, or an any way respond to, or asses the effects of "pollutants"
      (b) Claim or suit by or on behalf of a governmental authority for damages because of testing for, monitoring, cleaning up, removing, containing, treating, detoxifying, or neutralizing, or in any way responding to, or assessing the effects of "pollutants"

g. Aircraft, Auto, or Watercraft
"Bodily injury" or "property damage" arising out of the ownership, maintenance, use or entrustment to others of any aircraft, "auto" or watercraft owned or operated by or rented or loaned to any insured. Use includes operation and "loading or unloading"
This exclusion applies even if the claims against any insured allege negligence or other wrongdoing in the supervision, hiring, employment, training, monitoring of others by that insures, if the "occurrence" which caused the "bodily injury" or "property damage" involved the ownership, maintenance, use or entrustment to others of any, aircraft, "auto, or watercraft that is owned or operated by or rented or loaned to any insured
This exclusion does not apply to:
   (1) A watercraft while ashore on premises you own or rent
   (2) A watercraft you do not own that is
      a. Less than 25 feet long, and
      b. Not being used to carry persons or property of a charge
   (3) Parking an "auto" on, or on the way next to, premises, you on or rent, provide the "auto" is not owned by or rented or loaned to you by the insured.
   (4) Liability assumed under any "insured contract"" for the ownership, maintenance or use of aircraft or watercraft; or
   (5) "Bodily injury" or "property damage arising out of
      a. The operation of machinery or equipment that is attached to, or a part of, a land vehicle that would qualify under the definition of "mobile equipment" if it were not subject to a compulsory or financial responsibility law or other motor vehicle insurance law where it is licensed or principally garaged, or

FIG. 15

```
┌─────────────────────────────────────────────────────────────────────────────┐
│                    IOS Simulator — Ipad / IOS 7.1 (11D167)                  │
├─────────────────────────────────────────────────────────────────────────────┤
│ Carrier ☆                          11:30am                          100% ⌶  │
│  🔍    💾    🖨    ✉    📁    +                                        ≡   │
├─────────────────────────────────────────────────────────────────────────────┤
│   Insuring Agreements          Exclusion          Supplementary Payments    │
├─────────────────────────────────────────────────────────────────────────────┤
│   Edit      Match     Select                                       Reset   │
└─────────────────────────────────────────────────────────────────────────────┘
```

Direction of and within the scope of duties determined by you, and is not paid a fee, salary or other compensation by you or anyone else for their work performed for you 21. ⍰Your product⍰
   a. Means
      (1) Any goods or products, other than real property, manufactured, sold, handled, distributed, or disposed of by
         (a) You
         (b) Others trading under your name; or
         (c) A person or organization whose business or assets you have acquired; and
      (2) Containers (other than vehicles), materials, parts, or equipment furnished in connection with such goods or products b. Includes
      (1) Warrantees or representations made at any time with respects to the fitness, quality, durability, performance, or use of ⍰your product⍰; and
      (2) The providing of or failure to provide warnings or instructions
   c. Does not include vending machines or other property rented to or located for the use of others but not sold 22. ⍰Your work⍰
   a. Means
      (1) Work or operations performed by you or on your behalf; and
      (2) Materials, parts, or equipment furnished in connections with such work or operations b. Includes
      (1) Warrantees or representations made at any time with respect to the fitness, quality, durability, performance or use of ⍰your work⍰; and
      (2) The providing of or failure to provide warnings or instructions

TOTAL POLLUTION EXCLUSION WITH A BUILDING HEATING, COOLING, AND DEHUMIDIFYING EQUIPMENT EXCEPTION AND A HOSTILE FIRE EXCEPTION

[Exclusion f. under Paragraph 2. Exclusions of Section I ⍰ Coverage A - Bodily Injury and Property Damage Liability is replaced by the following]

This insurance does not apply to:

f. Pollution
   (1) ⍰Bodily injury⍰ or ⍰property damage⍰ which would not have occurred in whole or part but for the actual, alleged or threatened discharge, dispersal, seepage, migration, release, or escape of ⍰pollutants⍰ at any time.
      This exclusion does not apply to
      (a) ⍰Bodily injury⍰ if sustained within a building which is or was at any time owned or occupied by, or rented or loaned to, an insured and caused by smoke, fumes, vapor, or soot produced by or originating from equipment that is used to heat, cool, or dehumidify the building, or equipment that is used to heat water for personal use by the buildings occupants or their guest; or
      (b) ⍰Bodily injury⍰ or ⍰property damage⍰ arising out of heat, smoke, or fumes from a ⍰hostile fire⍰ unless that ⍰hostile fire⍰ occurred or originated;
         (i) At any premises, site, or location which is or was at any time used by or for any insured or others for the handling, storage, disposal, processing, or treatment of waste; or
         (ii) At any premises, site, or location on which any insured or any contactors or subcontractors working directly or indirectly on an insured⍰s behalf are preforming operations to test for, monitor, clean up, remove, contain, treat, detoxify, neutralize or in any way respond to, or assess the effects of ⍰pollutants⍰
   (2) Any loss, cost, or expense arising out of any

*FIG. 16*

FIG. 24 myForms | ISO

Home · Work in Progress · Upload · About · Help

Welcome AAAUSER · Logout

Results 1-8 of 8

| Form Number | Form Title | Predecessor | Last Modified | Actions |
|---|---|---|---|---|
| BT 00 01 xx xx | Copy of BROAD THEFT COVERAGE | BT 00 01 08 92 | 02/20/2015 06:31:09 | ☐Open ↓Download ☐Delete |
| EB 99 56 xx xx | Copy of LIMITED COVERAGE FOR SPECIFIED EQUIPMENT | EB 99 56 09 07 | 02/20/2015 04:01:30 | ☐Open ↓Download ☐Delete |
| BT 00 02 xx xx1 | Copy of BROAD THEFT COVERAGE | BT 00 02 08 92 | 02/20/2015 06:P56:57 | ☐Open ↓Download ☐Delete |
| BT 04 03 xx xx | PERSONAL THEFT SCHEDULE BROAD THEFT COVERAGE | BT 04 03 03 05 | 02/20/2015 06:43:12 | ☐Open ↓Download ☐Delete |
| CG 28 12 02 15 | Copy of PESTICIDE OR HERBICIDE APPLICATOR–LIMITED POLLUTION COVERAGE | CG 28 12 04 13 | 02/20/2015 11:59:07 | ☐Open ↓Download ☐Delete |
| BT 04 04 xx xx | Copy of PREMISES ALARM SYSTEM | BT 04 04 03 05 | 02/20/2015 06:51:15 | ☐Open ↓Download ☐Delete |
| WT 03 03 99 99 | Copy of WATERCRFT INCREASED LIMITS AND ASSISTANCE EXPENSE COVERAGE | WT 03 03 01 10 | 02/20/2015 06:35:37 | ☐Open ↓Download ☐Delete |
| IL 00 21 01 15 | NUCLEAR ENERGY LIABILITY EXCLUSION ENDORSEMENT | | 02/20/2015 12:26:17 | ☐Open ↓Download ☐Delete |

FIG. 25 myForms | ISO

Welcome AAAUSER  Logout
Home  Work in Progress  Upload  About  Help

Upload Form
● Coverage Endorsment Form  ○ Work in Progress FOrm

Form Number
Form Title
Line of Business
Effective Date
State Applicability
Manual Rules
Coverage Parts
Coverage Parts File  Browse
⊕ Upload

Copyright © 2015 Insurance Office Inc. All Rights Reserved

FIG. 30 myForms | ISO

Text Search
Position
○ Keywords ○ Match Exact text ○ Form Number

Line of Business
All Lines

Coverage
All

Jurisdiction
All Jurisdiction

Tag Filter

Company
All

Edition
All Editions

| Form Number | Form Title | Editions | Actions |
|---|---|---|---|
| ISO CG 00 01 03 13 | COMMERCIAL GENERAL LIABILITY COVERAGE FORM | Current | ○ View Info ☐ View Form |
| ISO CG 00 01 12 07 | COMMERCIAL GENERAL LIABILITY COVERAGE FORM | Previous | ○ View Info ☐ View Form |
| ISO CG 00 02 12 07 | COMMERCIAL GENERAL LIABILITY COVERAGE FORM | Current | ○ View Info ☐ View Form |
| ISO CG 00 01 03 13 | OWNERS AND CONTRACTORS PROTECTIVE LIABILITY COVERAGE FORM COVERAGE FOR OPERATIONS OF DESIGNATED CONTRACTOR | Previous | ○ View Info ☐ View Form |
| ISO CG 00 09 04 13 | OWNERS AND CONTRACTORS PROTECTIVE LIABILITY COVERAGE FORM COVERAGE FOR OPERATIONS OF DESIGNATED CONTRACTOR | Current | ○ View Info ☐ View Form |
| ISO CG 00 09 12 07 | RAILROAD LIABILITY COVERAGE FORM | Previous | ○ View Info ☐ View Form |
| ISO CG 00 35 04 12 | RAILROAD LIABILITY COVERAGE FORM | Current | ○ View Info ☐ View Form |
| ISO CG 00 35 12 07 | SOLLUTION LIABILITY COVERAGE FORM DESINGATED SITES | Previous | ○ View Info ☐ View Form |
| ISO CG 00 31 04 13 | SOLLUTION LIABILITY COVERAGE FORM DESINGATED SITES | Current | ○ View Info ☐ View Form |
| ISO CG 00 39 12 07 | | Previous | ○ View Info ☐ View Form |

1 2 3 4 5 6 7 8 9 10

Copyright © 2015 Insurance Office Inc. All Rights Reserved

FIG. 31

Line of Business: All Lines

Coverage: All

Jurisdi[ction]

View Info — 270

ISO CG 00 39 04 13 | POLLUTION LIABILITY COVERAGE FORM DESIGNATED SITES  [CLOSE]

Applicability edit view
This wording is applicable in all jurisdictions except NY

Manual Rules(s) edit
47 POLLUTION LIABILITY COVERAGE (Sublime code 350)
B. Description OF Pollution Liability Coverage
1. Two standard coverage forms are available of pollution Liability coverage. Both coverage forms provide bodily injury and property damage liability arising out of pollution incident, on a claims-made basis. On of the coverage forms also provides coverage for clean up cost.
2. For details of coverage
 a. Refer to Coverage Forms
  (1) Pollution Liability Coverage form CG 00 39

Notes edit

Results
| ISO CG | Form |
| ISO CG | Form |
| ISO CG | Form |
| ISO CG | Form |
| ISO CG | Form |
| ISO CG | Form |
| ISO CG | Form |

Tags edit
bodily injury|pollution|pollution liability|premises|

1 2 3 4 5 6 7 8 9 10

Copyright © 2015 Insurance Office Inc. All Rights Reserved

250

Applicable States

- ☑ ALASKA
- ☑ ALABAMA
- ☑ ARKANSAS
- ☑ ARIZONA
- ☑ CALIFORNIA
- ☑ COLORADO
- ☑ CONNECTICUT
- ☑ DISTRACT OF COLUMBIA
- ☑ DELAWARE
- ☑ FLORIDA
- ☑ GEORGIA
- ☑ GUAM
- ☑ HAWAII
- ☑ IOWA
- ☑ IDAHO
- ☑ ILLINOIS
- ☑ INDIANA
- ☑ KANSAS
- ☑ KENTUCKY
- ☑ LOUISIANA
- ☑ MASSACHUSETTS
- ☑ MARYLAND
- ☑ MAINE
- ☑ MICHIGAN
- ☑ MINNESOTA
- ☑ MISSOURI
- ☑ MISSISSIPPI
- ☑ MONTANA
- ☑ NORTH CAROLINA
- ☑ NORTH DECEIT
- ☑ NEBRASKA
- ☑ NEW HAMPSHIRE
- ☑ NEW JERSEY
- ☑ NEW MEXICO
- ☐ NEVADA
- ☑ NEW YORK
- ☑ OHIO
- ☑ OAKLAND
- ☑ OREGON
- ☑ PENNSYLVANIA
- ☑ PUERTO RICO
- ☑ RHODE ISLAND
- ☑ SOUTH CAROLINA
- ☑ SOUTH DECEIT
- ☑ TENNESSEE
- ☑ TEXAS
- ☑ UTAH
- ☑ VIRGINIA
- ☑ U.S. VIRGIN ISLANDS
- ☑ VERMONT
- ☑ WASHINGTON
- ☑ WISCONSIN
- ☑ WEST VIRGINIA
- ☑ WYOMING

[ Select All ] [ CLEAR ] [ OK ] [ Cancel ]

*FIG. 32*

- ☐ access device
- ☐ accident
- ☐ accident organization
- ☐ ACV
- ☐ additional insured
- ☐ addition locations
- ☐ additional locations
- ☐ additionally covered property
- ☐ adult day care
- ☐ aggregate limit
- ☐ air bill
- ☐ aicorot
- ☐ amendment
- ☐ animal
- ☐ application
- ☐ arbitration
- ☐ artificial generated
- ☐ assessment
- ☐ assisted living care
- ☐ auto
- ☐ auto care less coverage
- ☐ bacteria
- ☐ basic form
- ☐ binding
- ☐ blanket
- ☐ blanket insurance
- ☐ beat
- ☐ bodily injury exception
- ☐ bridge

- ☐ abuse
- ☐ access or disclosure
- ☐ accounts receivable
- ☐ actual cash value
- ☐ additional coverage
- ☐ additional interest
- ☐ additional residence
- ☐ administrator
- ☐ advertising injury
- ☐ agreed value
- ☐ alarm
- ☐ alterations
- ☐ amendment of limits
- ☐ annual aggregate
- ☐ appraisal
- ☐ architect
- ☐ asdf
- ☐ assign
- ☐ athlete
- ☐ auto exclusion
- ☐ automatic status
- ☐ bailed
- ☐ beneficiary
- ☐ biological
- ☐ blanket additional insured
- ☐ blood bank
- ☐ bodily injury
- ☐ brand
- ☐ brand form

[ CLEAR ] [ OK ] [ Cancel ]

View Info

ISOCG 00 39 04 13 | POLLUTION LIABILITY COVERAGE FORM DESINGATED SITES  [CLOSE] — 278

Applicability edit view
This wording is applicable in all jurisdictions except NY Manual Rules(s)  edit
47 POLLUTION LIABILITY COVERAGE (Sublime code 350)
B. Description OF Pollution Liability Coverage
 1. Two standard coverage forms are available of pollution Liability coverage. Both coverage forms provide bodily injury and property damage liability. arising out of pollution incident, On a claims-made bases: on of the coverage forms also provides coverage for clean up cost.
 2. For details of coverage
  a. Refer to Coverage Forms
   (1) Pollution Liability Coverage form CG 00 39

Notes  edit

Tags  edit
bodily injury|pollution liability|premises|

○ Block is Better
○ Save to Local
⦿ Save to Service As Another Version
New Form Number [CG 00 39 xx xx]
New Form Title [COPY OF LIABILITY COVERAGE]

[Proceed] [Cancel]

[ Edit ] [ Print ] [ Email ] [ View Info ] [ Add ] [ Close ]

Commercial General Liability
CG 00 39 04 13

POLLUTION LIABILITY COVERAGE FORM

DESIGNATED SITES

THIS FORM PROVIDES CLAIM-MADE COVERAGE.
PLEASE READ THE ENTIRE FORM CAREFULLY.

Various provisions in this policy restrict coverage. Read the entire policy carefully to determine rights, duties, and what is and is not covered.

Throughout this policy the words "you" and "your" refer to the Named Insured shown in the Declarations, and any other person or organization qualifying as a Named Insured under this policy. The words "we", "us", and "our" refer to the company providing this insurance.

The word "Insured" means any person or organization qualifying as such under Section II — Who is an Insured Other words and phrases that appear in quotation marks have special meaning. Refer to Section VI — Definitions.

SECTION I — POLLUTION LIABILITY COVERAGE

1. Insuring Agreement — Bodily Injury and Property Damage Liability
   a. We will pay those sums that the insured becomes legally obligated to pay as compensatory damages because of "bodily injury" or "property damage" to which the insurance applies. We will have the right and duty to defend the insured against any "suit" seeking those damages. However, we will have no duty to defend the insured against any "suit" seeking damages for "bodily injury" or "property damage" to which this insurance does not apply. We may, at our discretion, investigate any "pollution incident" and settle any claim or "suit" that may result. But:

Page 1 of 11   words:6,140

About | Help | Restore Forms | Alerts | Welcome

SEARCH  COMPOSE  MY PROJECTS  UPLOAD  ANALYTICS  REPORTS

Mozart Form Report Forms for State and Line of Business    Run Date 2/4/2016 2:00 PM    Create Another Form    Action Comical Auto Form Applicable in NJ as of 1/1/2015

| Form Number ▲ | Form Title | Library | Mandatory Non-Admitted |
|---|---|---|---|
| NJ-CA 12345 | Commercial Auto Form | ISO | ✓ |
| NJ-CA 12345 | Commercial Auto Form | ISO | ✓ |
| NJ-CA 12345 | Commercial Auto Form | COM | |
| NJ-CA 12345 | Commercial Auto Form | ISO | ✓ |
| NJ-CA 12345 | Commercial Auto Form | ISO | ✓ |

Comical Auto Form Applicable in NY as of 1/1/2015

| Form Number ▲ | Form Title | Library | Mandatory Non-Admitted |
|---|---|---|---|
| NJ-CA 12345 | Commercial Auto Form | ISO | ✓ |
| NJ-CA 12345 | Commercial Auto Form | ISO | ✓ |
| NJ-CA 12345 | Commercial Auto Form | COM | |
| NJ-CA 12345 | Commercial Auto Form | ISO | |
| NJ-CA 12345 | Commercial Auto Form | ISO | ✓ |

View the report or export it to PDF or Excel

SYSTEM AND METHOD FOR CREATING CUSTOMIZED INSURANCE-RELATED FORMS USING COMPUTING DEVICES

CROSS-REFERENCE TO RELATED APPLICATIONS

This application is a continuation of, and claims priority to U.S. patent application Ser. No. 15/085,795 filed on Mar. 30, 2016, now U.S. Pat. No. 11,068,644, which claims the benefit of U.S. Provisional Patent Application No. 62/140,234, filed on Mar. 30, 2015, the entire disclosures of which are expressly incorporated herein by reference.

FIELD OF THE INVENTION

The present invention relates to improvements in computing devices for use in the insurance-related professions. More specifically, the present invention relates to a system and method for creating customized insurance-related forms using computing devices.

RELATED ART

In the insurance industry, it is necessary to rapidly create customized insurance-related forms, such as underwriting agreements, insurance policies, exclusions, etc., in order to adequately serve the needs of customers. In the past, such forms were created using stand-alone computers using separate and unrelated software applications such as word processors, insurance form generation software, etc. One drawback of this approach is that an insurance professional is required to learn and utilize different software programs, thereby placing a burden on the professional. Also, insurance professionals often cannot create such forms "in the field" (e.g., at a prospective insured's location, or at some other remote location) due to the lack of computing equipment.

With the tremendous increase in computing power of mobile computing devices such as smart cellular telephones and tablet computers, there has been an explosive growth in the number and variety of software applications capable of being executed by such devices. Unfortunately, in the insurance-related professions, there has been a lack of adequate software applications which harness the power of such devices. In particular, software applications that execute on mobile computing devices and allow insurance professionals to rapidly and conveniently create customized insurance-related forms using such devices (in particular, using mobile telephones) are sorely lacking.

Accordingly, there is a need for useful software applications in the insurance-related industries, for use in creating customized insurance forms rapidly and with minimal burden to the insurance professional, using a wide array of computing equipment such as stand-alone and mobile computing devices.

SUMMARY

The present disclosure relates to a system and method for creating customized insurance-related forms (e.g., agreements, policies, exceptions, and other insurance-related documents) using a wide array of computing devices such as stand-alone computers, mobile computing devices such as cellular telephones, tablet computers, etc. The system allows a user to quickly and conveniently create customized insurance-related forms using such devices, and to transmit same to one or more remote users and/or computing systems for further processing. In one embodiment, the system includes a custom forms software application that executes on the mobile computing device and allows a user to create a customized insurance form beginning with a template selected form a database of forms. The application automatically identifies/recommends relevant clauses to be included in the form based upon search terms and/or other parameters identify by the user, and allows the user to customize the forms using such clauses. The application allows the user to create and customize insurance-related forms using the touchscreen interface of a mobile computing device, and does not require the user to interact with other types of computing equipment (e.g., stand-alone computers, etc.). The device can be carried into the field and can allow the user to rapidly create customized insurance-related forms on the fly and at any desired location.

In another embodiment, a web-based user interface is provided for allowing rapid creation and editing of customized insurance forms using any suitable computing device such as stand-alone computer, mobile computing device, mobile phone, etc. The web-based user interface is driven by a customized forms software application executing on one or more remote servers accessible via the Internet.

BRIEF DESCRIPTION OF THE DRAWINGS

The foregoing features of the invention will be apparent from the following Detailed Description, taken in connection with the accompanying drawings, in which:

FIGS. 6-20 are screenshots illustrating user interface screens generated by the system on a mobile computing device;

FIGS. 23-56 are screenshots illustrating a web-based user interface generated by the system of FIG. 21 for allowing insurance professionals to create customized insurance forms.

DETAILED DESCRIPTION

Figure 55:
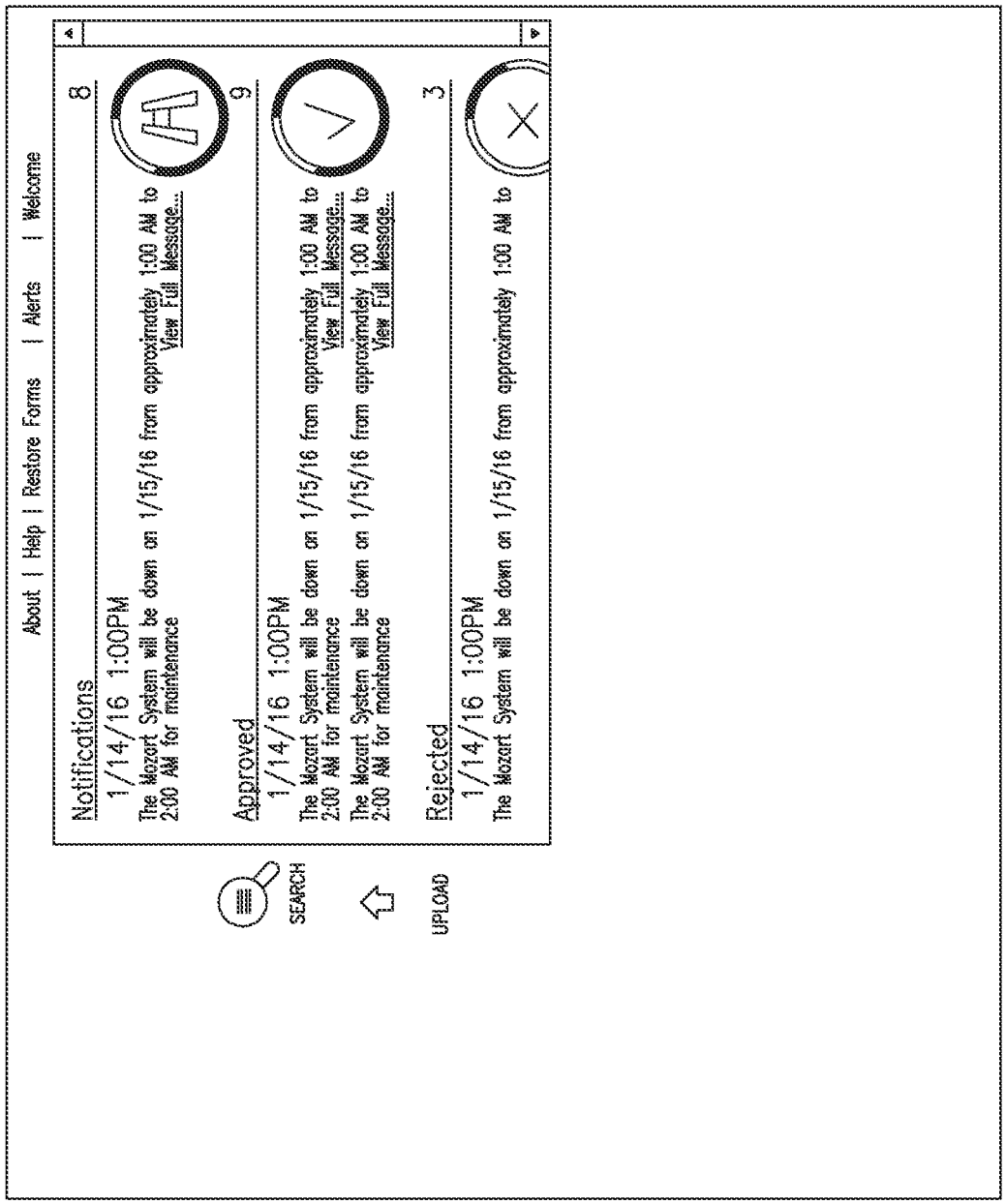
Figure 56:

The present disclosure relates to a system and method for creating customized insurance forms using mobile computing devices, as described in detail below in connection with FIGS. 1-56. It is noted that two embodiments of the invention are disclosed herein. In the first embodiment (FIGS. 1-20), the system of the present disclosure is embodied as a customized forms software application that can execute on a mobile computing device such as a smart cellular telephone, tablet computer, etc. In the second embodiment (FIGS. 21-56), the system of the present disclosure is embodied as a web-based software application that is remotely hosted and can be accessed by a wide variety of computing devices (e.g. stand-alone personal computers, mobile computing devices, etc.) via a suitable network connection, such as (but not limited to) the Internet.

Figure 1:
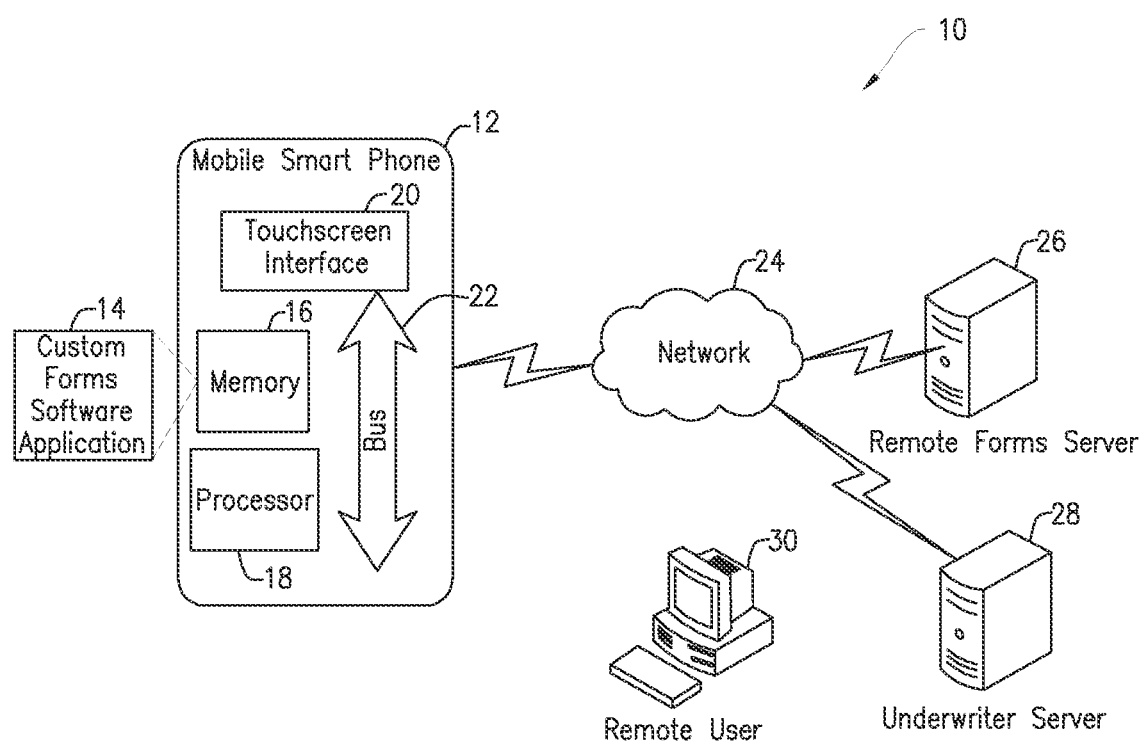
FIG. 1 is a diagram illustrating hardware and software components in accordance with one embodiment of the system of the present disclosure.

FIG. 1. is a diagram illustrating the first embodiment of the custom forms generation system of the present invention, indicated generally at 10. The system 10 includes a mobile computing device 12, such as a smart mobile phone (e.g., a smart mobile telephone running an ANDROID or IOS operating system, such as a SAMSUNG or APPLE IPHONE smart phone), a tablet computer (e.g., an APPLE IPAD), and/or a laptop computer. The mobile device 12 includes a custom forms software application 14 which is stored in memory 16 of the mobile device 12 and executed by the processor 18 of the mobile device 12. As will be discussed in greater detail below, the application 14 allows a user of the mobile device 12 to quickly and conveniently create customized insurance-related forms (agreements, policies, exclusions, documents, etc.) via a simple, easy-to-use user interface generated by the application 14 and accessible to the user via the touchscreen interface 20 of the mobile device 12. As is known in mobile computing devices, a bus 22 permits communication between the memory 16, processor 18, and touchscreen interface 20.

Optionally, the mobile device 12 can communicate with one or more remote devices such as a remote forms server 26, an underwriting server 28, and/or a remote user computer 30, via a communications network 24 (which could include a cellular data communications network (3G, 4G, LTE, etc.), the Internet, a wide area network, a local area network, a wireless network, etc.). The remote forms server 26 could remotely store customized forms generated by the mobile device 12, and/or it could periodically transmit pre-defined template forms to the mobile device 12 for use by the application 14 in generating customized forms for a user. The underwriting server 28 could receive forms that have been created using the mobile device 12 and automatically process such forms for insurance underwriting purposes, if desired. The remote user computer system 30 could permit any desired remote user, such as an insurance professional, underwriter, actuary, legal professional, etc., to remote access, view, and/or edit customized insurance forms generated by a user of the mobile device 12. As can be appreciated, due to the portability and ubiquity of mobile computing devices (particularly smart phones), a user of the mobile device 12 can quickly and conveniently create customized insurance forms "on-the-fly" and at any desired location without having to bring cumbersome paperwork, extra computing devices, etc., to such locations. For example, using the mobile computing device 12, an insurance agent can quickly and conveniently create a customized insurance agreement for a potential client at the client's house or place of business using only the mobile device 12, thereby facilitating more rapid sales of insurance products to customers.

Figure 2:
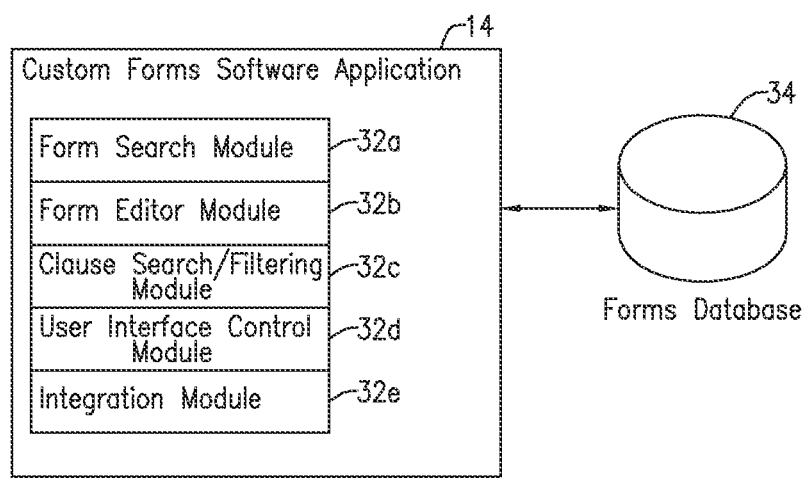
FIG. 2 is a diagram illustrating the custom forms software application of the present disclosure in greater detail.

FIG. 2 is a diagram illustrating the custom forms software application 14 of the mobile device 12 in greater detail. The application 14 includes a plurality of software modules including a form search module 32a, a form editor module 32b, a clause search/filtering module 32c, a user interface control module 32d, and an optional integration module 32e. The application 14 communicates with a forms database 34 which could be stored on the mobile device 12 or remotely therefrom (e.g., in the remote forms server 26) and which stores customized forms generated by the application 14 as well as template forms for use by users of the mobile device 12 in creating customized insurance forms. The forms search module 32a allows a user to search for one or more desired insurance forms to be customized using the mobile device 12. The form editor module 32b allows the user to edit a desired form using the mobile device 12. The clause search/filtering module 32c allows a user to search for a desired clause (e.g., a pre-defined paragraph of text relating to a particular provision for an insurance agreement) for insertion into a form being created by the user. As will be discussed in greater detail below, the module 32c allows the user to conduct "tagged" searches for desired causes, to allow the user to rapidly identify and utilize relevant clauses for use in customizing a form. The user interface control module 32d creates and controls the graphical user interface (GUI) for the application 14 (displayed on the touchscreen interface 16 of FIG. 1) and handles user input/control of the application via touch controls/gestures using the touchscreen interface 16. The optional integration module 32e allows the application 14 to communicate with external applications (e.g., another software application executing on the mobile device 12 or on a remote computer) for various purposes, e.g., to transmit customized forms that have been created using the mobile device 12 to a remote server (such as the underwriting server 28 of FIG. 1) for further processing thereby, and/or to receive information from a remote computer (such as the remote forms server 26 of FIG. 1) for use by the application 14.

Figure 3:
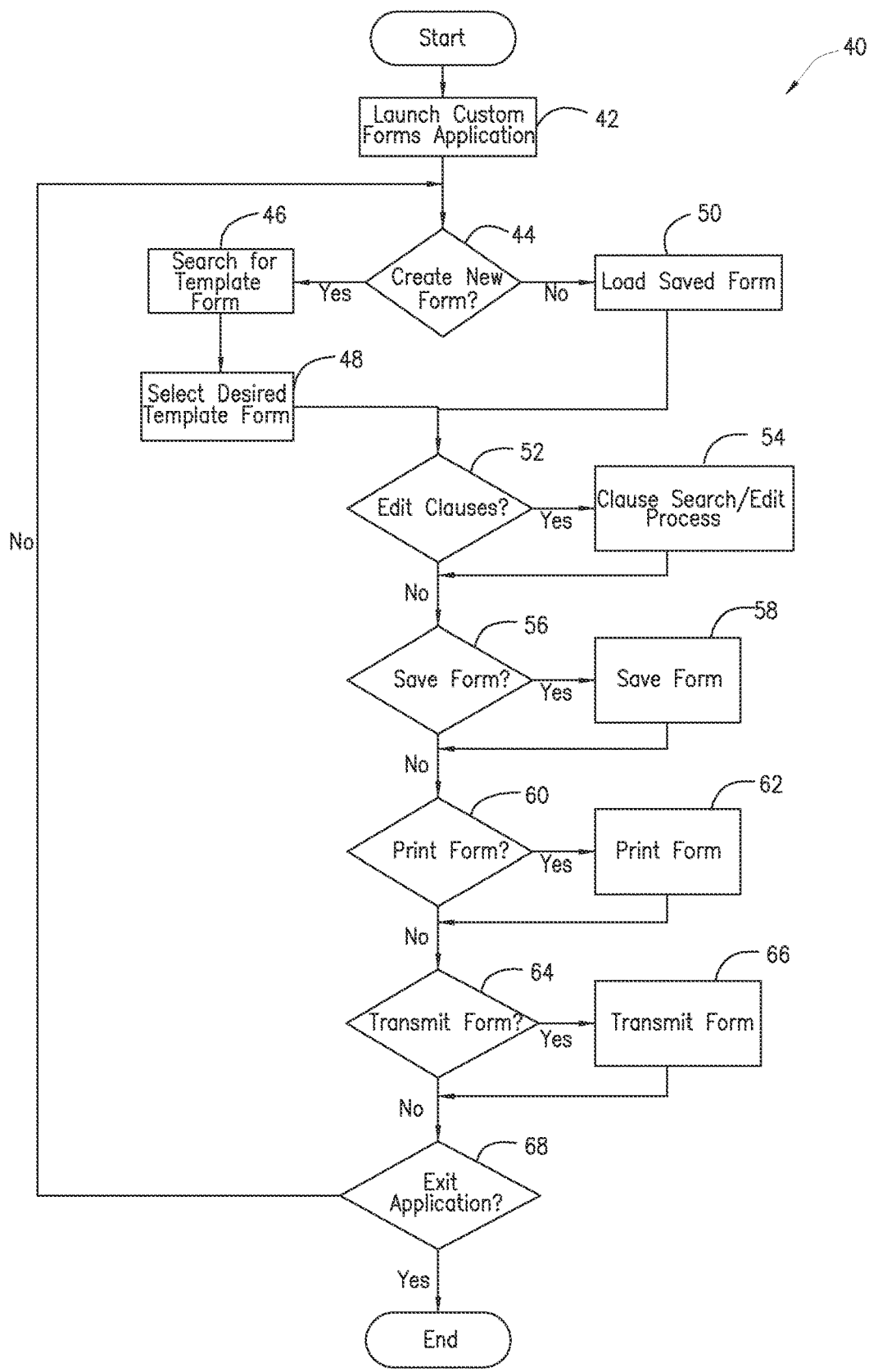
FIGS. 3-5 are flowcharts illustrating processing steps carried out by the system of the present disclosure.

FIG. 3 is a flowchart illustrating processing steps (indicated generally at 40) carried out by the application 14 to allow a user to create customized insurance forms using the mobile computing device 12. Beginning in step 42, the application is launched by the user (e.g., by tapping on an icon on the touchscreen interface 16 of the mobile device 12). Then, in step 44, a determination is made as to whether the user wishes to create a new form. If a positive determination is made, step 46 occurs, wherein the user searches for a template form to be used as a starting point to create a customized form. As noted above, the template forms could be stored in the forms database 34 of FIG. 4 and searched by the application 14. In step 48, the user selects a desired template form to be used, and the form is loaded into the GUI of the application 14. Control then passes to step 52, described below. If a negative determination is made in step 44, step 50 occurs, wherein the user selects a previously-created and saved insurance from to be edited. The form could be saved in the database 34 of FIG. 2, retrieved therefrom, and loaded into the GUI of the application 14.

In step 52, a determination is made as to whether the user wishes to edit one or more clauses of the form. If a positive determination is made, step 54 occurs, wherein the application executes a clause search/edit process, described in detail below in connection with FIG. 4, to allow the user to create and/or edit customized causes to be included in the form. In step 56, a determination is made as to whether the user wishes to save the form. If so, step 58 occurs, wherein the form is saved (e.g., the database 34). In step 60, a determination is made as to whether the user wishes to print the form. If so, step 62 occurs, wherein the application 14 prints the form using a printer in communication with the mobile device 12. In step 64, a determination is made as to whether the user wishes to transmit a customized form to a remote device and/or user (e.g., via e-mail or through another electronic transmission means). If so, step 66 occurs, wherein the form is transmitted from the mobile device 12 to a remote device and/or user. In step 68, a determination is made as to whether the user wishes to exit the application. If so, the application 14 terminates and processing ends. Otherwise, control returns to step 44.

Figure 4:
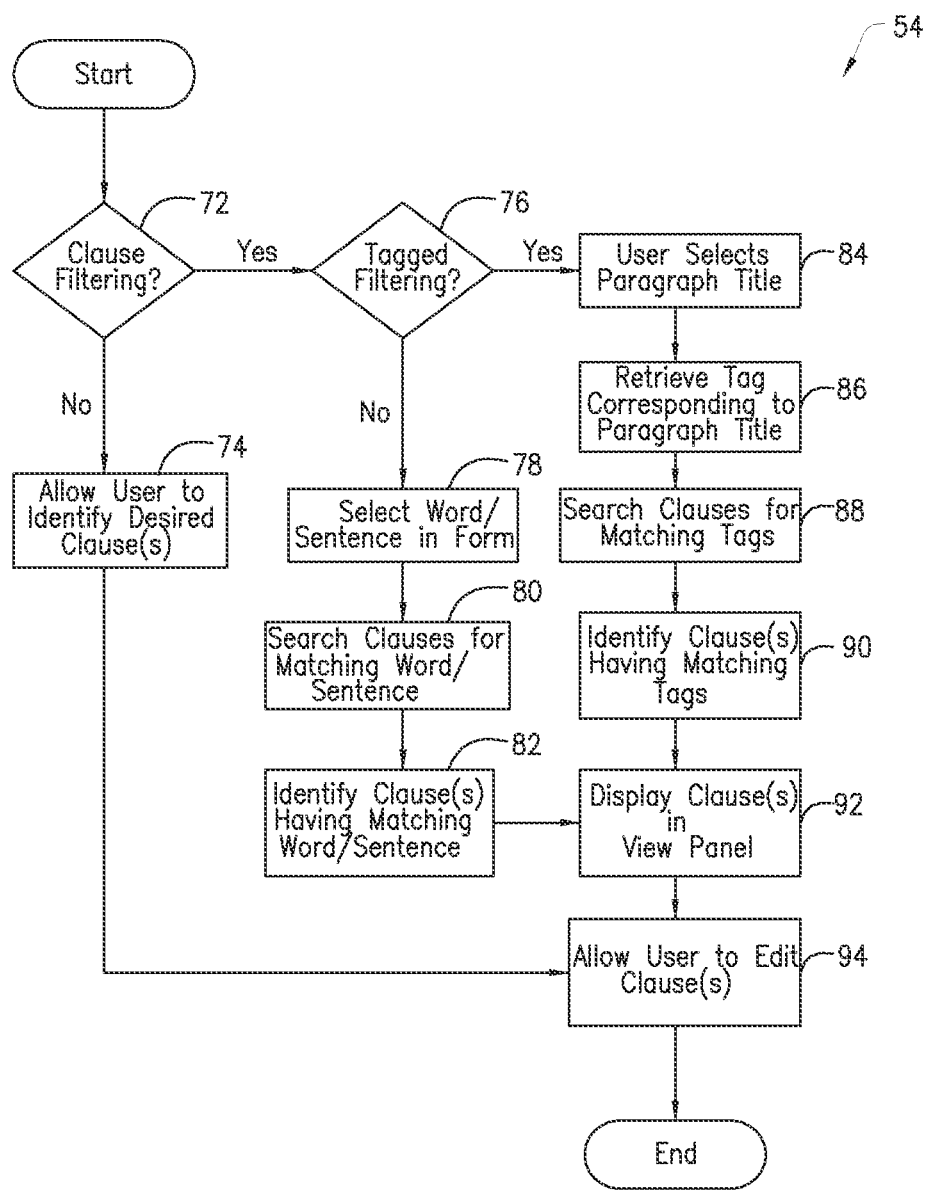

FIG. 4 is a flowchart illustrating, in greater detail, processing steps carried out by the clause filtering/search process 54 of FIG. 3. Beginning in step 72, a determination is made as to whether the user wishes to filter specific clauses in a form. If a negative determination is made, step 74 occurs, wherein the user can optionally identify specific clauses within the form by scrolling through the form using the touchscreen interface and tapping on the desired clause. Then, in step 94, the user can edit the clause, if desired. Otherwise, if a positive determination is made, step 76 occurs, wherein a determination is made as to whether the user wishes to conduct "tagged" filtering of clauses within the form. If a negative determination is made, step 78 occurs, wherein the user can select a word and/or sentence in the form by highlighting the word and/or sentence using the GUI displayed on the touchscreen 16 of the device 12. Then, in steps 80-82, the application 14 identifies pre-defined clauses that have provisions (text) matching the selected words and/or sentences. Next, in step 92, the application 14 displays matching clause(s) in a display panel in the GUI, and the user can select one or more causes for insertion into the form by tapping on the clauses in the display panel. This functionality will be described in greater detail below in connection with FIGS. 13-14. The user can also edit the selected clause(s) in step 94.

If a negative determination is made in step 76, step 84 occurs, wherein the user can select the title of a desired paragraph in a form by pointing to the title using the touchscreen interface 16 and tapping on the title. Then, in step 86, the application 14 retrieves a pre-defined "tag" (metadata) corresponding to the title selected by the user. Then, in step 88, the application 14 searches for pre-defined clauses having tags which match the tag corresponding to the title selected by the user. In step 90-92, the application 14 identified pre-defined clauses having tags which match the tag corresponding to the title selected by the user. Next, in step 92, the application 14 displays matching clause(s) in a display panel in the GUI, and the user can select one or more clauses for insertion into the form by tapping on the clauses in the display panel. This functionality will be described in greater detail below in connection with FIGS. 13-14. The user can also edit the selected clause(s) in step 94.

Figure 5:
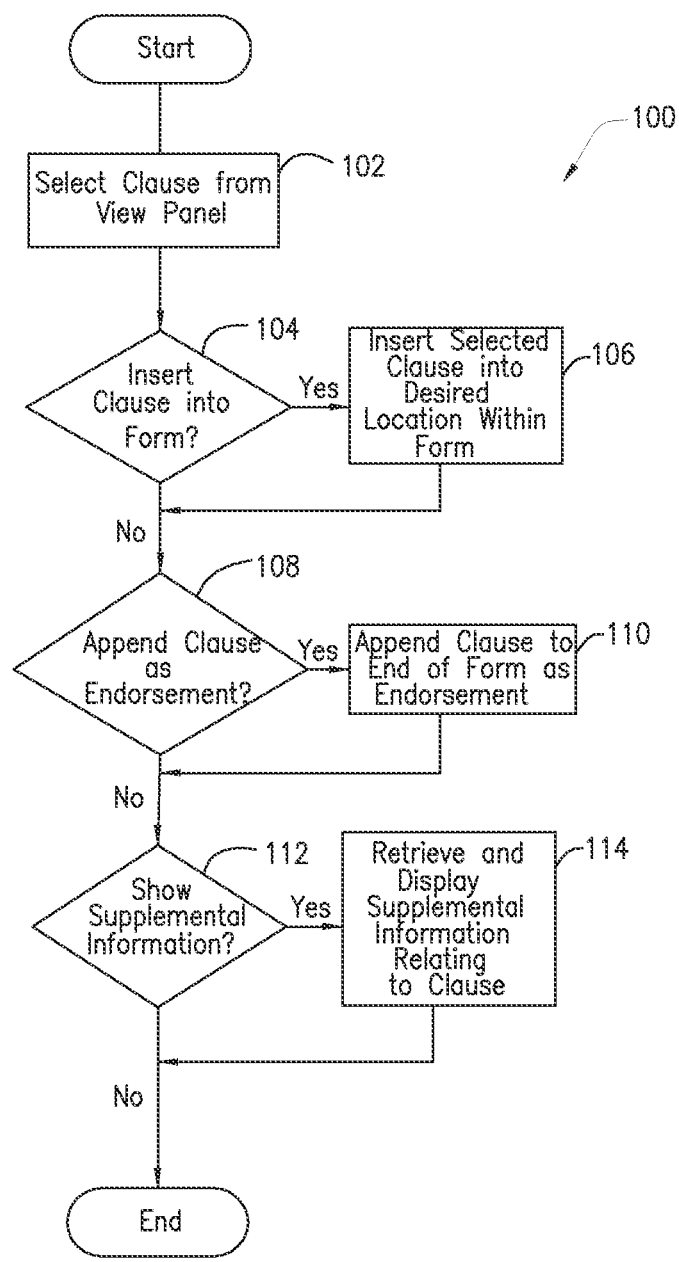

FIG. 5 is a flowchart illustrating processing steps (indicated generally at 100) carried out by the application 14 for allowing a user to insert and/or append selected clauses into a form, and to also retrieve and display supplemental information relating to clauses. Beginning in step 102, the user selects a desired clause from a list of clauses displayed in the view panel of the GUI in the touchscreen interface 16. Then, in step 104, a determination is made as to whether the user desires to insert the selected clause into the form. If so, step 106 occurs, wherein the selected clause is inserted into the form at a location identified by the user (e.g., by tapping on a location in the form where the user wishes to insert the clause). In step 108, a determination is made as to whether the user wishes to append the selected clause to the end of the form as an endorsement to the form. If so, step 110 occurs, wherein the clause is appended to the end of the form as an endorsement. In step 112, a determination is made as to whether the user wishes to show supplemental information associated with the selected clause. If so, step 114 occurs, wherein the application 14 retrieves and displays to the user supplemental information associated with the clause. Processing then ends.

FIGS. 6-20 are screenshots illustrating operation of the application 14 on the mobile device 12. As shown in FIG. 6, the application 14 generates a GUI on the touchscreen interface 16 of the mobile device 12 which allows the user to create customized insurance-related forms. The GUI includes a tool bar 120, navigation tool bars 122-124, and a form display/editor screen region 126 wherein a customized insurance form can be created, viewed, and/or edited using the touchscreen interface 16. The tool bar 120 will be discussed in greater detail in connection with FIG. 8. The toolbar 122 includes controls labeled "Insuring Agreements," "Exclusions," and "Supplementary Payments" which can be activated by tapping on the respective controls. When the "Insuring Agreements" control is tapped, the application 14 lists all insuring agreements that are relevant to the insurance form being displayed in the screen region 126, so that the user can quickly and conveniently navigate to related agreements. When the "Exclusions" control is tapped, the application 14 lists all insurance coverage exclusions (i.e., types of insurance coverage which are excluded from coverage) associated with the insurance form displayed in the screen region 126. When the "Supplementary Payments" control is tapped, the application 14 displays supplementary insurance payments (and optionally, schedules therefor) associated with the insurance form displayed in the screen region 126. The toolbar 124 allows a user to edit the form displayed in the screen region 126 (by tapping on the "Edit" control), to find matching text within the form displayed in the screen region 126 (by tapping on the "Match" control), to select specific portions of text within the form displayed within the screen region 126 (by tapping on the "Select" control), and to reset any changes that were previously made to the form displayed in the screen region 126 (by tapping on the "Reset" control).

FIG. 7 is a screenshot illustrating form editing capabilities provided by the application 14. As shown, an editor too bar 128 is provided (for allowing the user to edit the form), and a text editor screen area 130 is provided (which allows the user to edit the form by tapping on desired provisions of the form, deleting text, adding text by typing, etc.).

Figure 8:
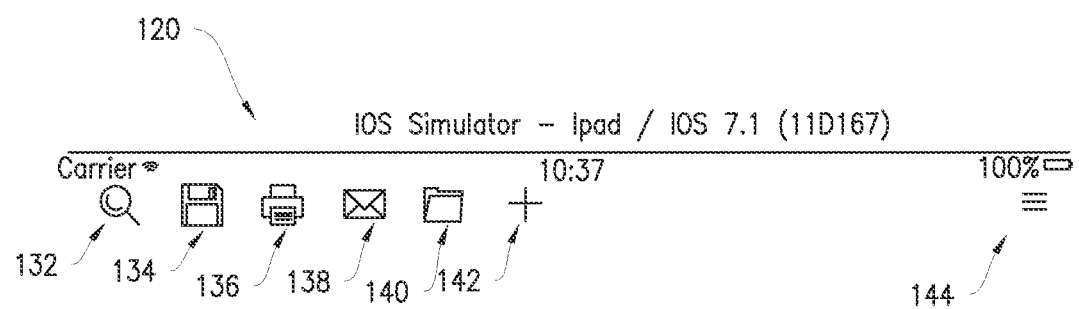

FIG. 8 is a screenshot illustrating the tool bar 120 in greater detail. As shown, the tool bar 120 includes a search icon 132, a save icon 134, a print icon 136, an e-mail icon 138, a form search icon 140, a create new form icon 142, and a clause search icon 144. A user can search for a desired provision within a form by tapping on the search icon 132. A user can save the current form being edited/created by tapping on the save icon 134. A user can print the current form by tapping on the print icon 136. A user can send the current form to a remote user and/or device by tapping on the e-mail icon 138. A user can search for a desired form, and load such a form, by tapping on the form search icon 140. A user can create a new form by tapping on the new form icon 142. Finally, a user can access one or more pre-defined clauses (e.g., to be added to the existing form) by tapping on the clause search icon 144.

Figure 9:

FIG. 9 is a screenshot illustrating print functionality of the application 14. When the user taps on the print icon 136 shown in FIG. 8, a printer dialog box appears in the GUI as shown in FIG. 9. The dialog box allows the user to select a printer to which to print the current form, and specify the desired number of copies to be printed.

Figure 10:

FIG. 10 is a screenshot illustrating a clause selection view panel 150 displayed by the application 14. The view panel 150 lists all clauses that are available to be inserted into the current form displayed in the screen region 126, and subsequently edited once inserted, if desired. As can be seen, the applicable clauses could relate to various insurance-related provisions, such as coverage exclusions, contact definitions, amendments, etc. The clauses listed in the panel 150 could be filtered using tagged filtering and/or filtering by relevant words/sentences, as discussed above in connection with FIG. 5. The user can insert and/or append a desired clause to the current form displayed in the screen region by tapping on a desired clause in the list.

FIG. 11 is a screenshot illustrating selection by a user of a particular clause. As can be seen, the text of the selected clause is displayed to the user, and the user can apply either apply the clause to the current form (at a location within the current form defined by the user, and/or at a pre-defined location) by tapping on the "Tap Here to Apply" icon, or add the clause as an endorsement at the end of the current form by tapping the "Add as Endorsement" icon.

Figure 12:
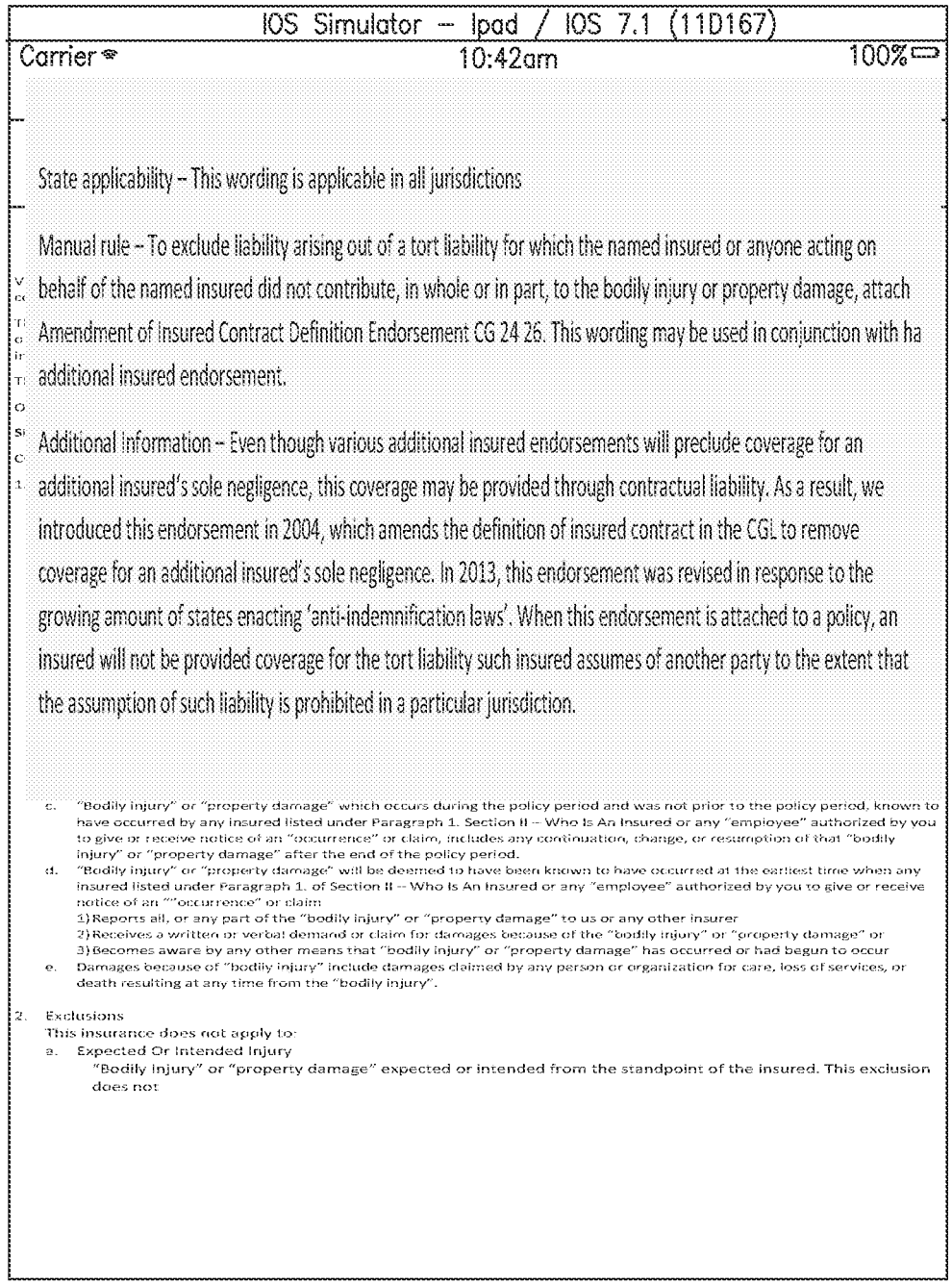

FIG. 12 is a screenshot illustrating supplemental information generated and displayed by the application 14 and relating to a desired clause selected by a user. As can be seen, the supplemental information describes relevant information about the clause, such as states where the clause is applicable, information about rules associated with the clause, and any relevant additional information.

Figure 13:
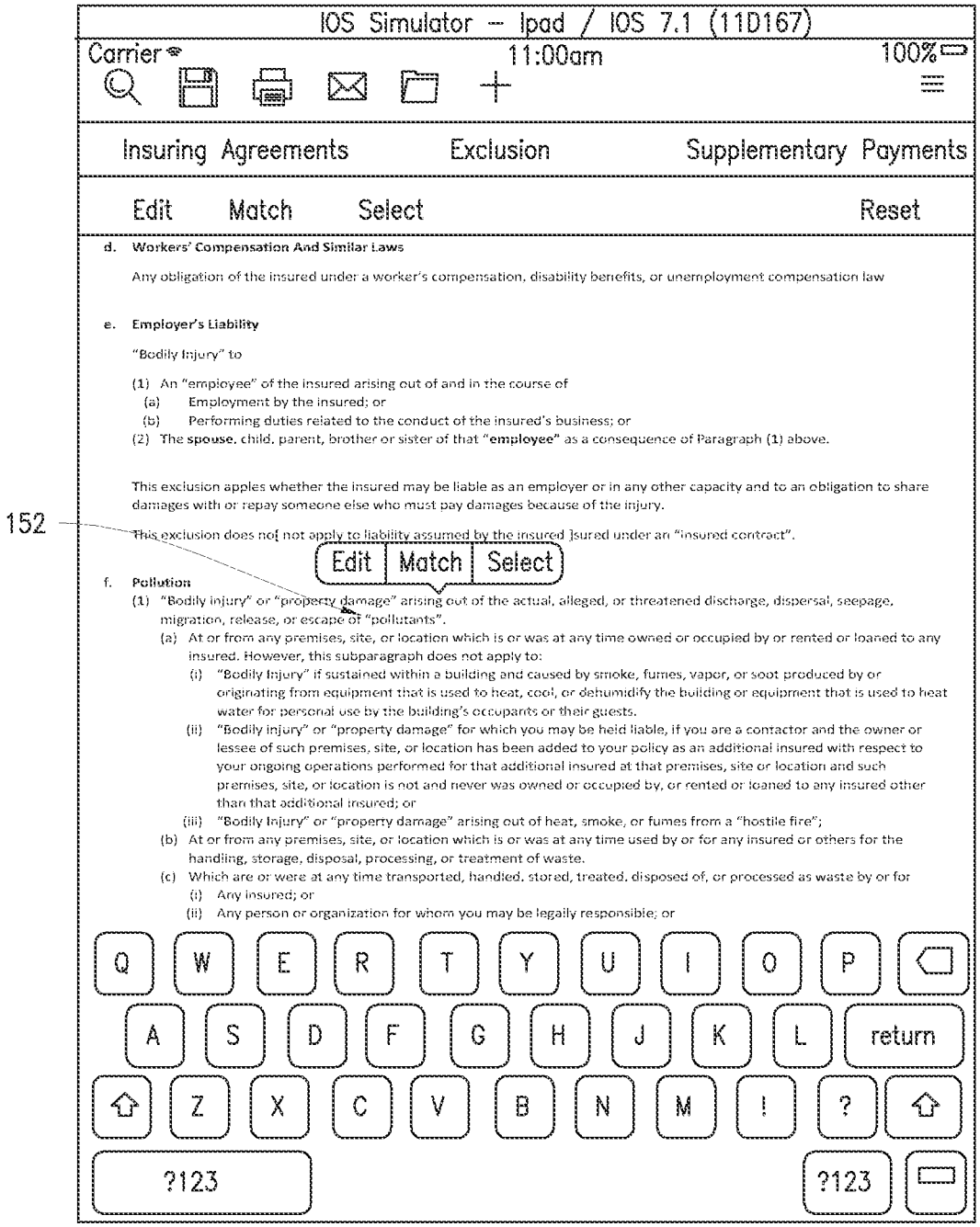

FIGS. 13-14 are screenshots illustrating clause filtering functionality provided by the application 14 based on words and/or sentence selected by the user within the form displayed on the screen portion 126. As shown in FIG. 13, the user can highlight a desired term within the form (as shown in FIG. 13, the term "pollutants") using a text highlighting tool 152. When the desired text has been highlighted, the user can select one or more menu options displayed above the highlighted text, including editing the text by tapping the "Edit" icon, identify matching terms within the form by tapping the "Match" icon, and/or selecting matching clauses by tapping the "Select" icon. As shown in FIG. 14, if the user clicks the "Select" icon, the application 14 automatically retrieves one or more relevant clauses relating to the highlighting term (in this case, a "Total Pollution Exclusion" clause relevant to the term "pollutants" highlighted in FIG. 13) and displays the clause to the user. The user can then insert the clause, if desired, into the form by tapping the "Tap Here to Apply" icon in FIG. 14, or the user can append the clause to the end of the form as an endorsement by clicking the "Add as Endorsement" icon in FIG. 14.

FIG. 15 is a screenshot illustrating insertion of the "Total Pollution Exclusion" clause shown in FIG. 14 into the body of the form. As can be seen, the clause is automatically inserted into the body of the form at the appropriate location within the form. Optionally, the user could specify another location within the form where he/she should like to see the clause inserted.

FIG. 16 is a screenshot illustrating the "Total Pollution Exclusion" clause shown in FIG. 14 appended to the end of the form as an exclusion provision. As can be seen, the clause is automatically inserted at the end of the form as an exclusion to the insurance agreement, as is customary in the insurance industry. Of course, the user could specify another location within the form where he/she would like to see the clause inserted.

As can be appreciated from the discussion above in connection with FIGS. 13-16, the system of the present invention allows a user to rapidly create customized insurance-related forms on mobile devices with a minimum amount of user interaction required. Indeed, the automatic identification/recommendation of relevant clauses by the application 14 allows the user to rapidly create customized insurance-related forms anywhere, and in particular, in the field.

Figure 17:
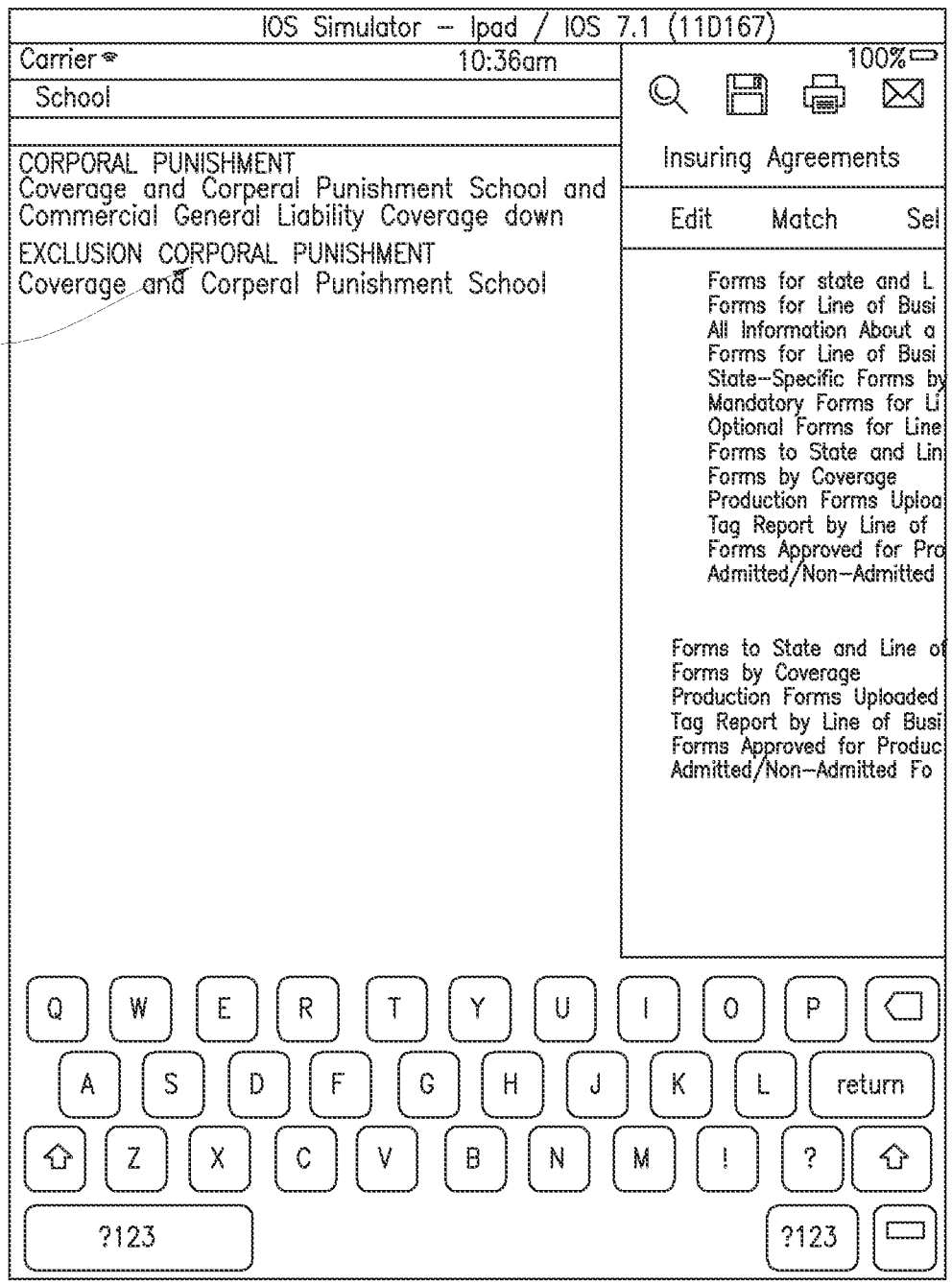

FIG. 17 is a screenshot illustrating the search functionality provided by application 14. As can be seen, the user can search for a desired term (in this case, the term "School" was entered as the search parameter in the search bar at the top of the user interface), and can search for all clauses which relate to the term being searched. As can be seen, relevant clauses are identified in a list 154 displayed in the clause display panel of the user interface (in this case, exclusion clauses relating to corporal punishment occurring within schools are displayed, but of course, other relevant clauses relating to the searched term could be displayed).

Figure 18:
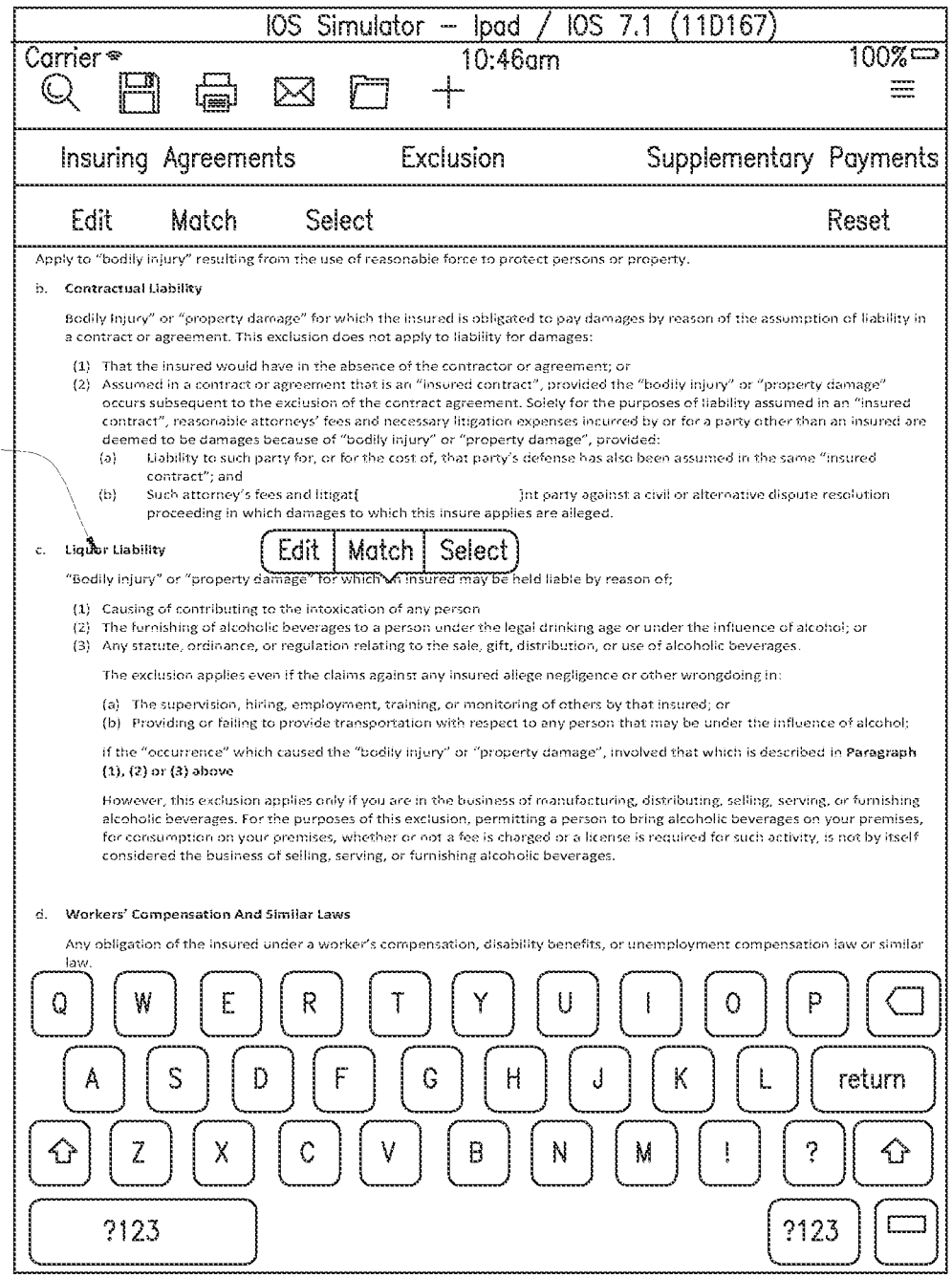
Figure 19:

FIGS. 18-19 are screenshots illustrating "tagged" searching for clauses provided by the application 14. As shown in FIG. 18, the user can highlight an entire section of the form by clicking on the title of the section (in this case, the title "Liquor Liability") using the highlighting tool 156. When the desired text has been highlighted, the user can select one or more menu options displayed above the highlighted text, including editing the text by tapping the "Edit" icon, identify matching sections within the form by tapping the "Match" icon, and/or selecting matching clauses by tapping the "Select" icon. As shown in FIG. 19, if the user clicks the "Select" icon, the application 14 automatically retrieves one or more relevant clauses relating to the highlighted section (in this case, clauses relevant to the section highlighted in FIG. 18) and displays a list 158 of the relevant clauses to the user. The user can then select a desired clause and insert the clause, if desired, into the form or the user can append the clause to the end of the form as an endorsement.

Figure 20:
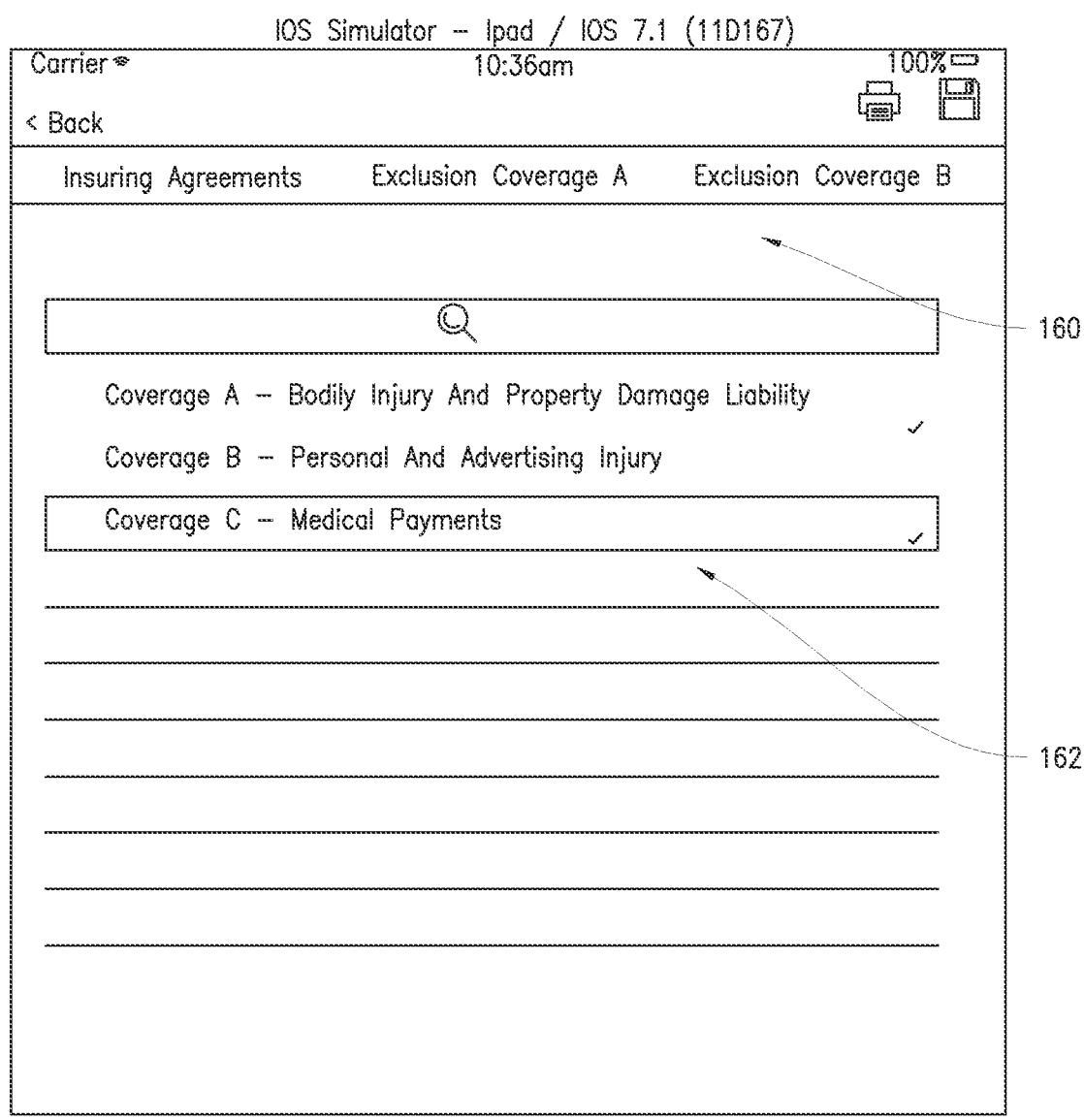

FIG. 20 is a screenshot illustrating the new form creation functionality provided by the application 14. A tool bar 160 allows the user to select from a category of template forms for initiating creation of the desired form, such as insuring agreement (by tapping the "Insuring Agreements" icon) and various exclusions (by tapping the "Exclusions Coverage A" or "Exclusions Coverage B" icons). As shown in FIG. 20, if the user selects the "Insuring Agreements" icon in the toolbar 160, the user is provided with a list 162 of relevant agreement types corresponding to various types of coverages (e.g., bodily injury, personal injury, medical payments, etc.). The user can then select one of the agreement types by tapping on same, whereupon the application 14 loads the template agreement into the screen region 126 and the user can customize the form agreement in accordance with the customization features described above.

Figure 21:
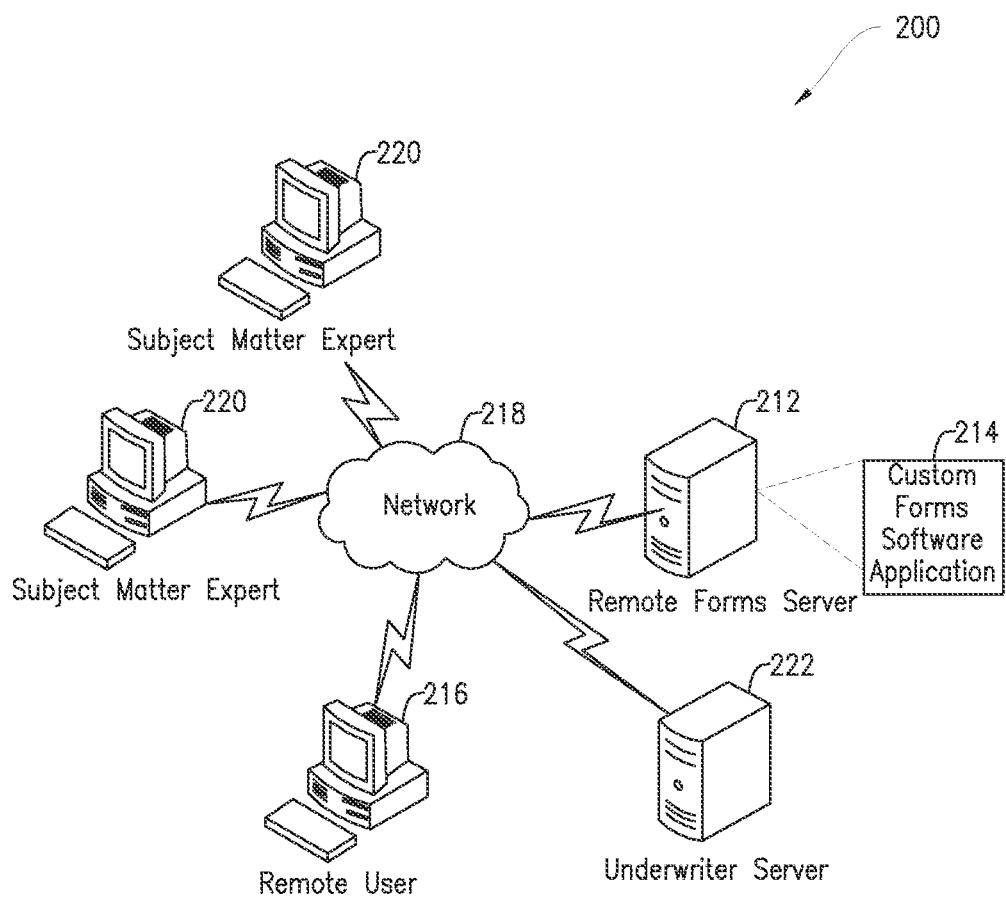
FIG. 21 is a diagram illustrating another embodiment of the system of the present disclosure, wherein a web-based customized forms applications is provided on a remote forms server and is accessible via the Internet.

FIG. 21 is a diagram illustrating another embodiment of the system of the present disclosure, indicated generally at 200, wherein a web-based customized forms application 214 is provided on a remote forms server 212 and is accessible via a suitable network connection 218, such as, but not including, the Internet. As with the previous embodiment of the present disclosure discussed above in connection with FIGS. 1-20, this embodiment of the system permits insurance professionals to rapidly and conveniently create customized insurance forms using a wide array of computing devices, such as stand-alone computer systems (e.g., PCs), mobile computing devices, etc. In this embodiment, the forms application 214 creates a web-based user interface that can be accessed by a remote user computer system 216 (e.g., an insurance professional using a personal computer, tablet computer, etc.) using a conventional web browser executing on the remote user computer system 216. It is also noted that the remote forms server 212 (and the custom forms software application 214) could be accessed by other users, such as subject matter expert who have particular expertise in processing insurance forms, such as "tagging" particular terms in insurance forms and scoring such forms.

Such subject matter experts could access the server 212 using their own computer systems, such as computer systems 220 shown in FIG. 21. Additionally, it is noted that customized forms created using the server 212 could be electronically transmitted to an underwriting server 212 (e.g., a server operated by an insurance underwriting agent), for further processing of the forms.

Figure 22:
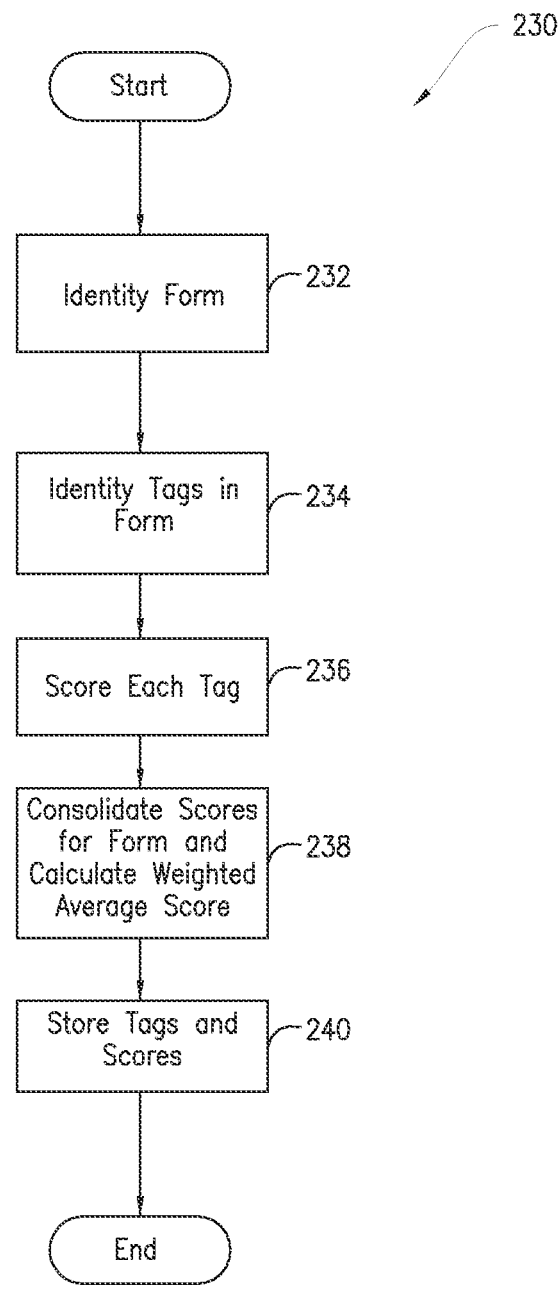
FIG. 22 is a flowchart illustrating additional processing steps carried out by the system of the present disclosure for creating tags for insurance forms and for scoring those tags.

FIG. 22 is a flowchart illustrating additional processing steps, indicated generally at 230, carried out by the system of the present disclosure for creating tags for insurance forms and for scoring those tags. In particular, it is noted that the system 200 of FIG. 21 provides a computing "platform" wherein customized insurance forms can be created or uploaded to the system, and those forms can be tagged by subject matter experts to identify keywords or "tags" in the forms that can be used for later searching and matching functions. Moreover, the subject matter experts can assign scores to the tags, so as to optimize future searching and matching functionality of the system 200. Beginning in step 232, a desired insurance form is identified (e.g., by one or more of the subject matter experts in FIG. 21 using the expert's associated computing system), and in response, the server 212 (under control of the customized forms applications 214) transmits the desired form to the subject matter expert computer 220. The subject matter expert 220 then reviews the form in step 234 and flags or identifies key words or terms of importance in the form. Then, in step 236, the subject matter expert 220 scores each key word with a numeric score (e.g., a score of 1 could be of low importance, and a score of 10 could be of very high importance). In step 238, the application 214 gathers all tags and scores and calculates a consolidated score for the form, as well as a weighted average score for the form. For example, if three subject matter experts (SMEs) score a given tag with a score of 10, and one subject matter expert scores that tag with a score of 2, then the average would be an 8 (32/4). Of course, the scores generated by some SMEs may be weighted greater than other SMEs, if desired. For example, if one SME has been scoring longer and is better than others at accurately scoring tags, then the system can weight that SME's scores higher than others (e.g., that SME's score could be weighted by a factor greater than 1, so that his/her score is more valuable than others). Finally, in step 240, the system stores the tags and the scores (e.g., in a relational database stored on the server 212 or on another computer system in communication with the server 212). The tags and scores can be used to quickly and conveniently locate relevant insurance forms and/or clauses for insertion into such forms, as disclosed herein.

Figure 23:
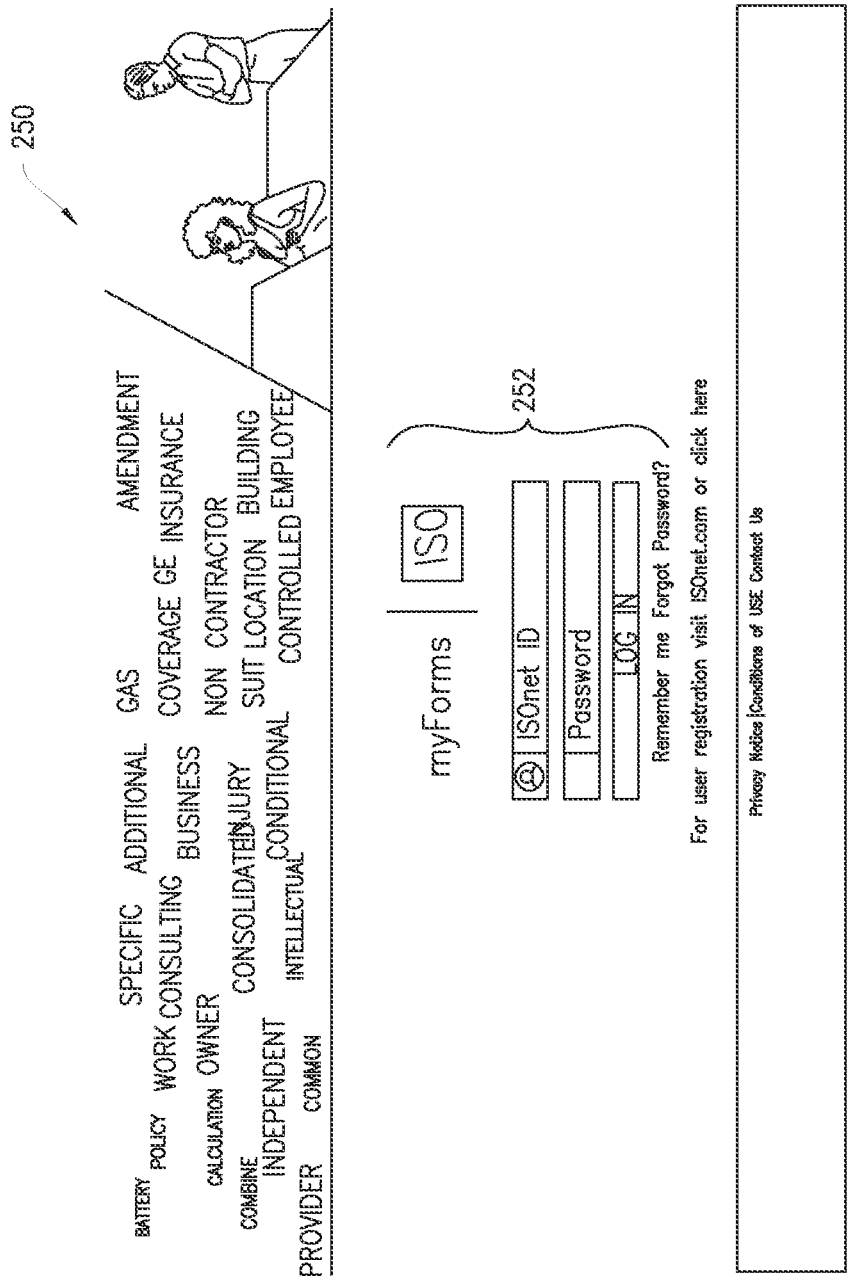

FIGS. 23-43 are screenshots illustrating a web-based user interface 250 generated by the system of FIG. 21 for allowing insurance professionals to create customized insurance forms. The interface 250 can be accessed using a conventional web browser executing on a computer system, and is driven by the customized forms application 214 executing on the server 212. As shown in FIG. 23, the interface 250 can first provide a login screen which requests that the user input login in information using the input prompts 252. The user could be authenticated using any suitable technology, such as login/password combinations or other types of authentication.

Figure 24:
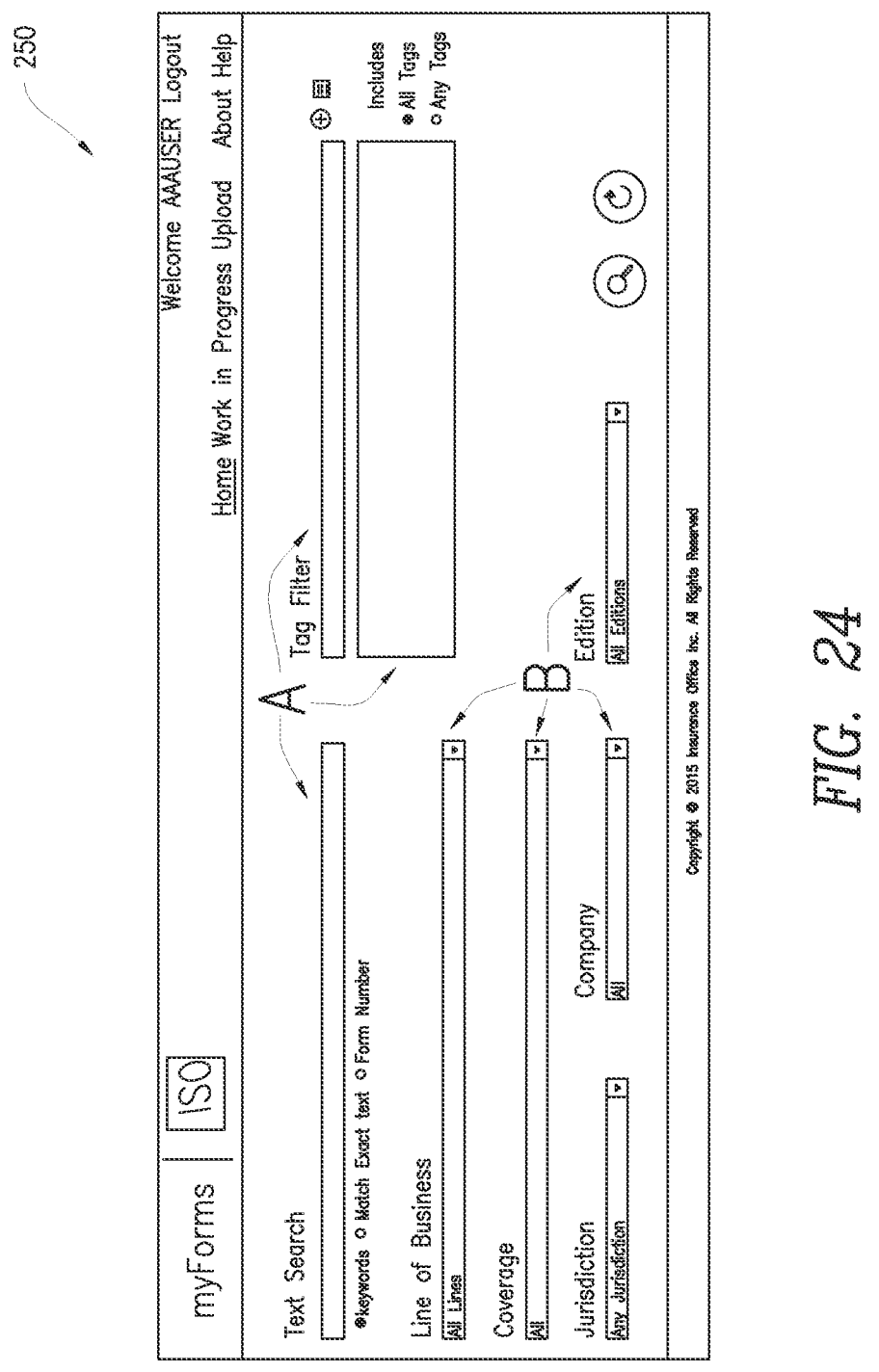

As shown in FIG. 24, once the user is logged in, the interface 250 allows the user to begin building a customized form using the searching controls "A" and "B" shown in FIG. 24. The controls "A" include, for example, a text search field which allows the user to conduct keyword searches, match exact text, or to identify a desired form using a form number. Additionally, the user can conduct tag filtering, wherein the user can enter one or more tags to be searched, if desired. The controls "B" include, for example, other search criteria that can be specified using various controls, such as lines of business, types of insurance coverage, jurisdictions, company names, editions, etc.

As shown in FIG. 25, the user can also access and modify an existing form that was previously saved by the user, by clicking the "Work in Progress" link 254. Thereupon, the interface 250 provides the user with a list 256 of insurance forms. The list 256 identifies the names and titles of forms that have been created and/or accessed by the user, as well as predecessor names for the forms, dates/times of last modification of the forms, and action buttons that the user can click to perform various actions, such as opening the form, downloading the form to his/her local computer, and/or deleting the form.

As shown in FIG. 26, the interface 250 includes functionality for allowing a user to upload a form to the system. This can be accomplished using controls 258 which allow the user to specify a form name, form title, line of business for the form, effective date of the form, state applicability, manual rules applicable to the form, coverage parts, one or more tags for the form, and a file name associated with the form. Once the file has been identified (e.g., stored on the user's local computer or another computer system), it can be uploaded to the system by clicking on the "Upload" button.

Figure 27:
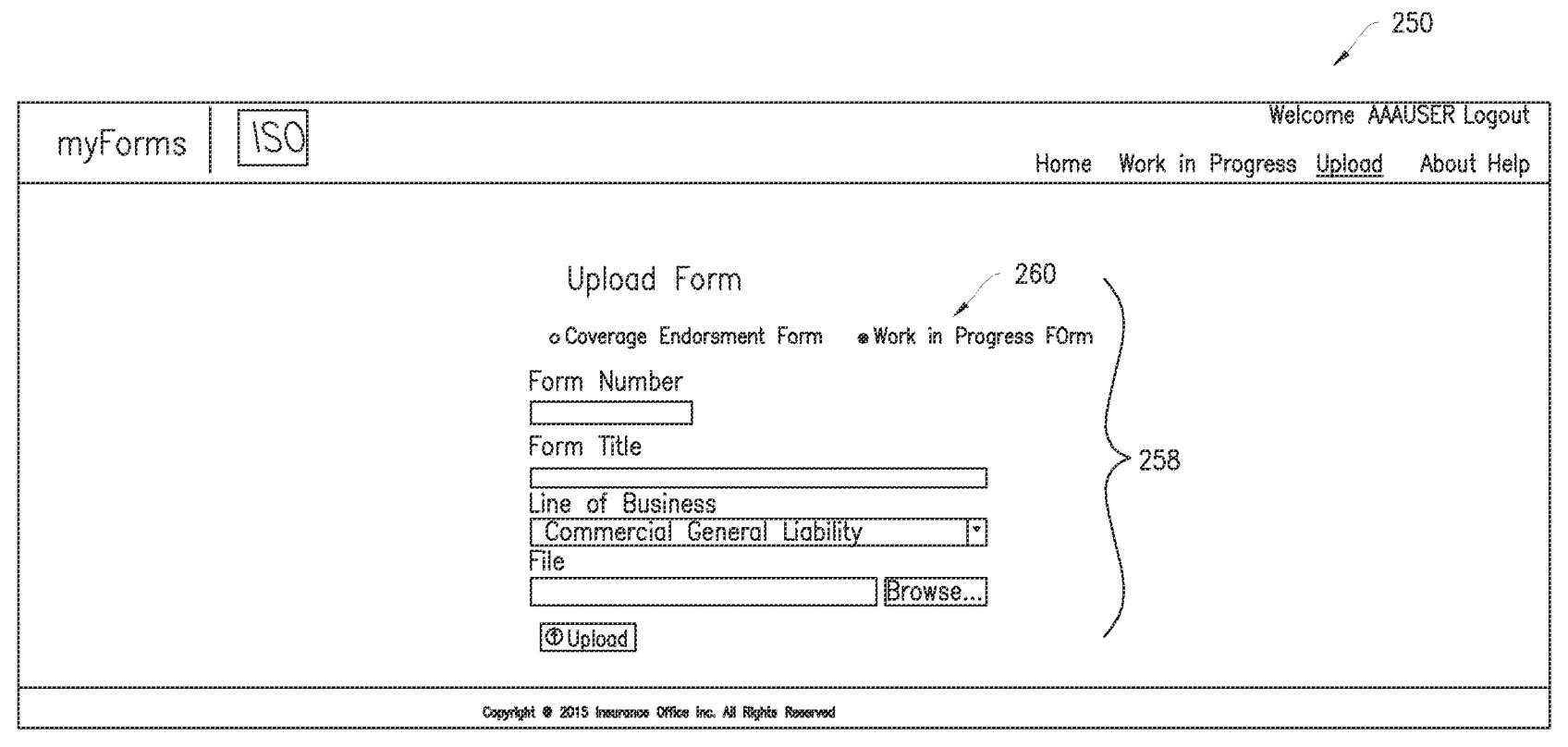

It is noted that different upload controls 258 could be provided depending on the type of form. For example, as shown in FIG. 26, the controls 258 are expanded for use with a coverage or endorsement type of insurance form. However, as shown in FIG. 27, a reduced set of controls 258 could be provided for allowing the user to upload a "work in progress" form, e.g., a form that the user intends to work on at a later point in time.

Figure 28:
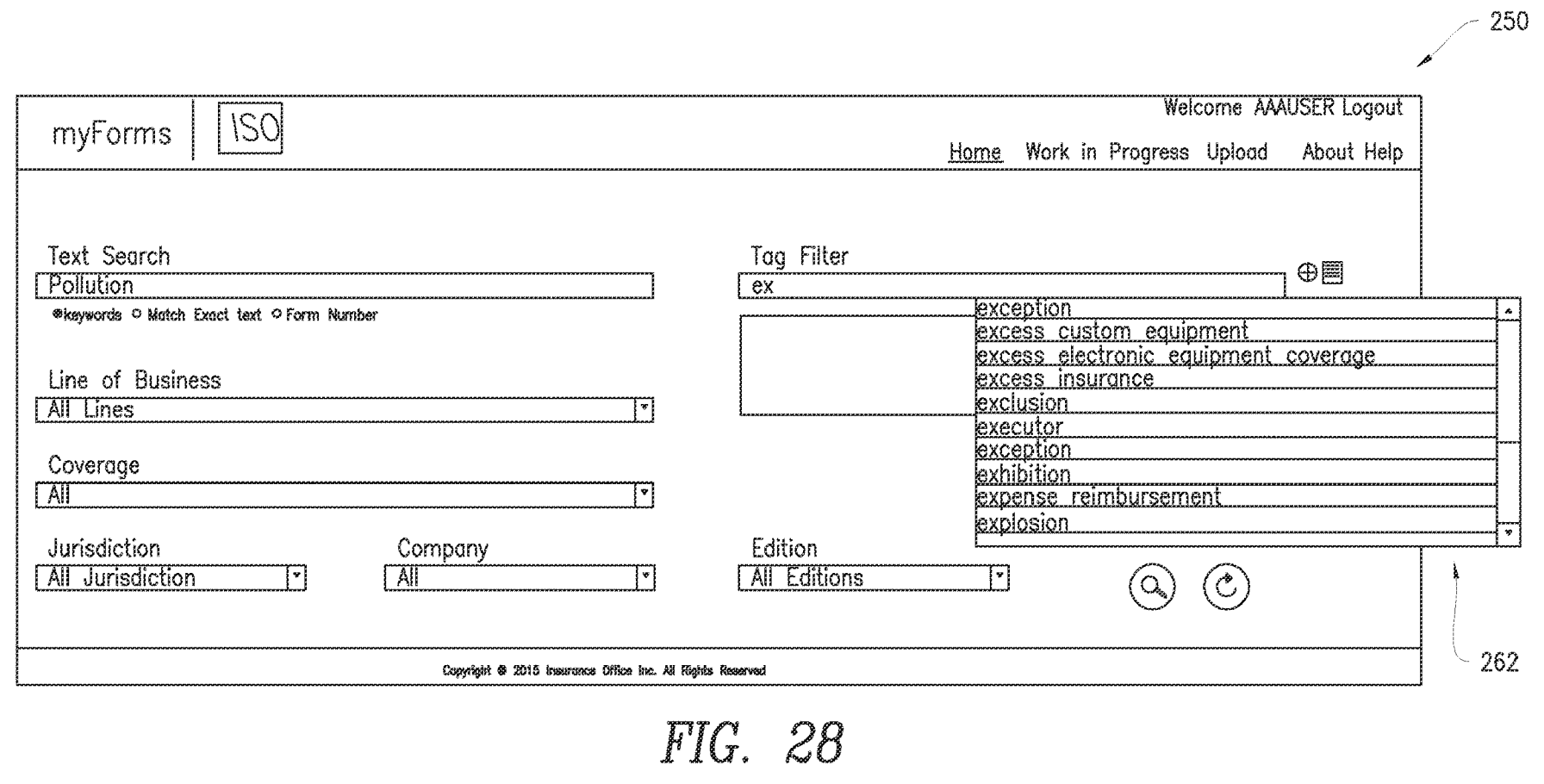
Figure 29:
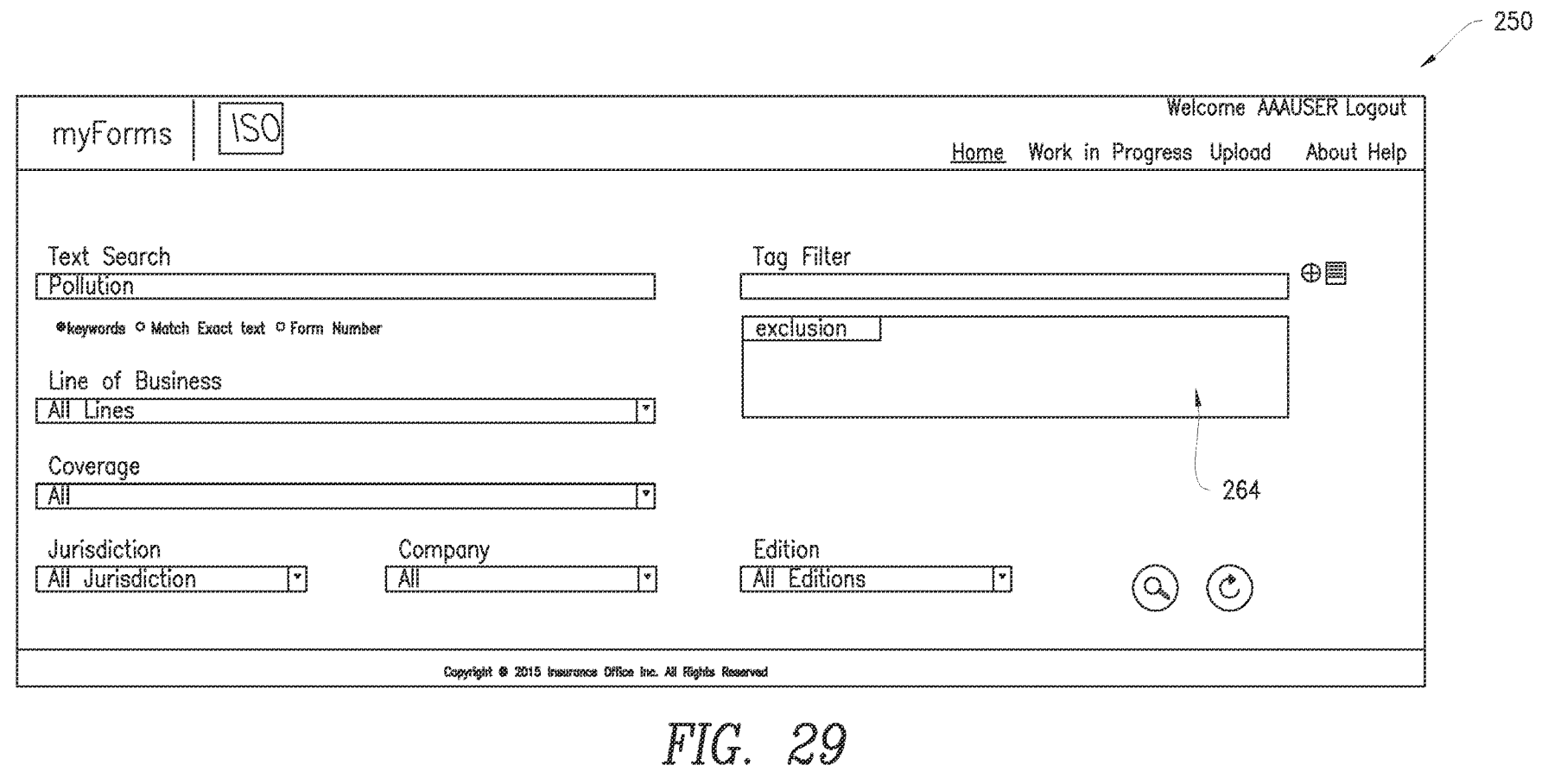

As shown in FIG. 28, tagging filter functionality of the interface 250 is illustrated. A tag filter "pull-down" control 262 is provided, wherein the user can conduct filtering of tags associated with forms by clicking on one (or more) desired tags in the control 262. For example, if the user wishes to identify all insurance forms which relate to insurance coverage for accidents involving explosions, the user could click on the "explosion" tag in the pull-down 262. Also, as shown in FIG. 29, a text input control 264 is provided so that the user can enter free-form text for tag filtering purposes. Thus, as shown in FIG. 29, the control 264 includes the keyword "exclusion" (which has been selected by the user using the control 262 of FIG. 28), and the user can edit that text or add additional text for tag searching purposes, if desired. It is noted that two "radio buttons" could be provided so that the user can further limit or expand searching—i.e., if the "all tags" button is selected, the system will identify all forms where all tags include the tags appearing in the input control 264. Otherwise, if the "any tag" button is selected, the system will identify any form that has at least one tag that includes the search term specified in the control 264.

As shown in FIG. 30, text searching can be conducted using the text search field 266. As shown, the user has specified the search term "pollution." The results of the search are listed in list 268, i.e., the list 268 includes all forms that include the word "pollution." The user can click the "View Info" buttons to view information about the forms, or the "View Forms" buttons to access and/or edit the forms, if desired.

As shown in FIG. 31, when the user clicks on the "View Info" button for one of the forms listed in the list 268 of FIG.

30, a window 270 is displayed, which contains detailed information about the form. For example, the window could display applicability information relating to the form (as shown), as well as manual rules associated with the form and/or notes relating to the form. Each of these fields of information can be edited by the user, if desired.

As shown in FIG. 32, the user can specify applicable states for a form using the applicable states window 272. As can be seen, the window 272 includes a list of states along with checkboxes that can be clicked to identify the applicable states.

Similarly, as shown in FIG. 33, checkbox-actuated lists can also be utilized to identify tags to be associated with a particular form. Thus, as shown, a list 274 could be provided which lists tags to the user, and the user can select desired tags that will be associated with the form by clicking on the associated check boxes corresponding to the tags.

Figure 34:
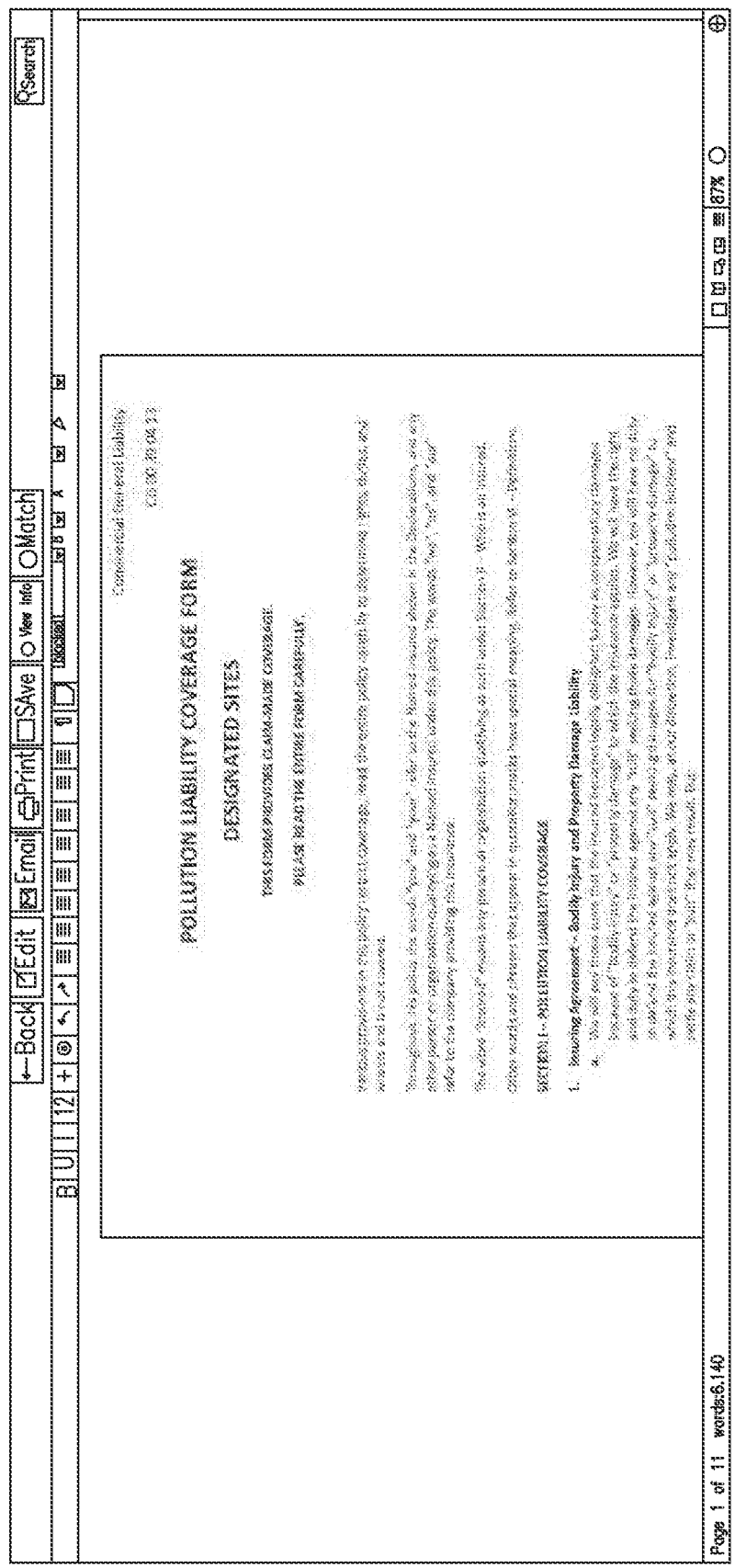

As can be seen in FIG. 34, the interface 250 also provides an editor screen 276 which allows the user to view and/or edit a desired form. This screen has much of the functionality of a conventional word processor, in that the user can add text, delete text, format text, change fonts, etc., using the controls at the top of the editor screen 276. Those controls are also identified as controls "B" in FIG. 35. Moreover, another set of controls "A" (also shown in FIG. 35) allow the user to perform specific tasks such as going back to a previous function, e-mailing the form to a desired recipient, printing the form, saving the form, viewing information associated with the form, and finding matching tags and/or other forms. Indeed, as can be seen in the controls "C" of FIG. 35, a panel is provided for allowing the user to search by form numbers, if desired, and the panel lists other forms that are related to the form currently being edited in the editor screen 276. This allows the user to very quickly and conveniently access language in other related forms that could be cut and pasted into the form being edited into the editor screen 276, thus providing a powerful editing/customization tool. The related forms in the panel C could be accessed by clicking on them, if desired.

Figure 35:
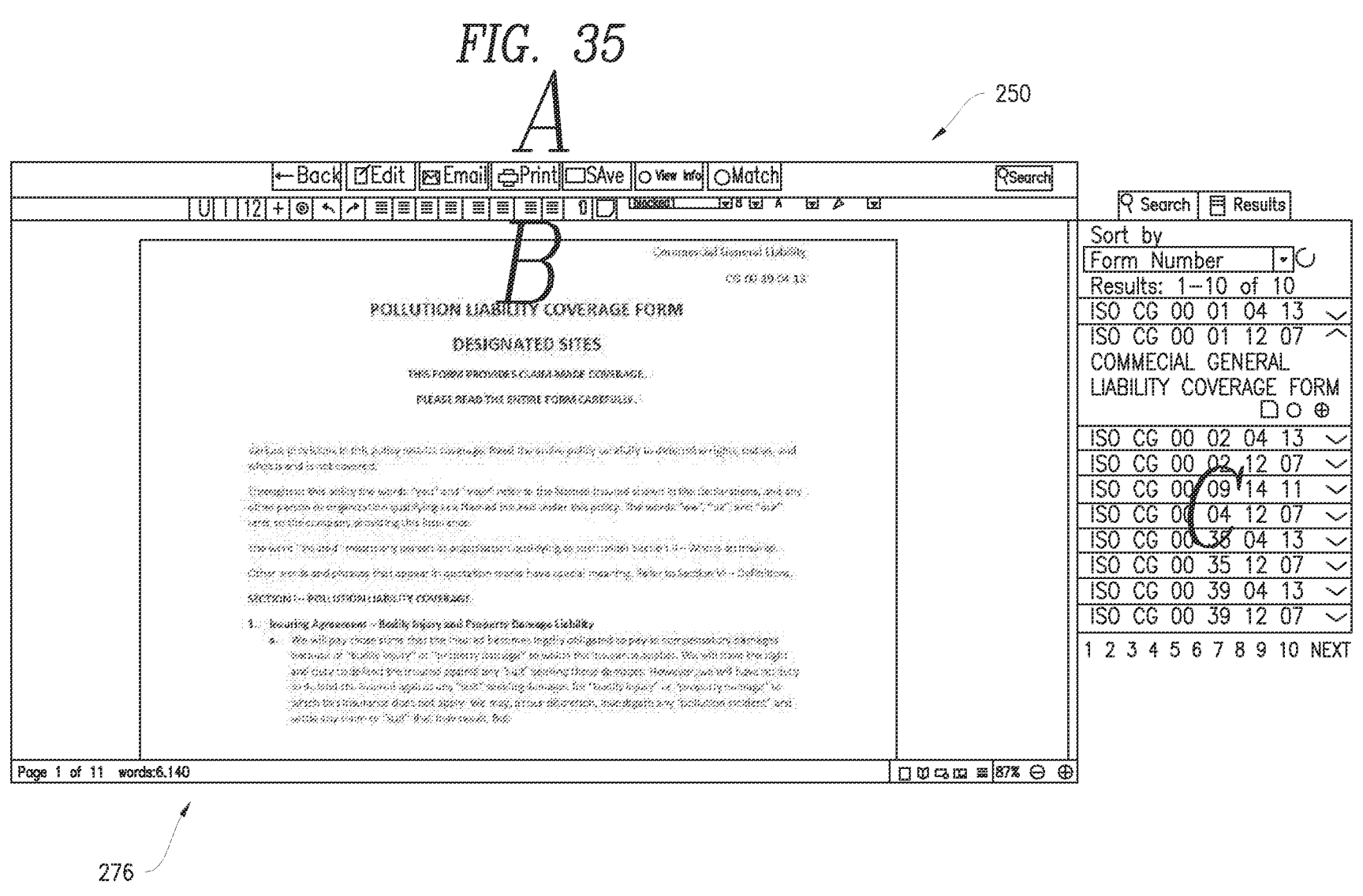

FIG. 36 illustrates an information window 278 generated by the system, which relates to the form being edited in the editor 276 of FIG. 35. As can be seen, the user can edit applicability information, manual rules, and/or take notes if desired.

Figure 38:
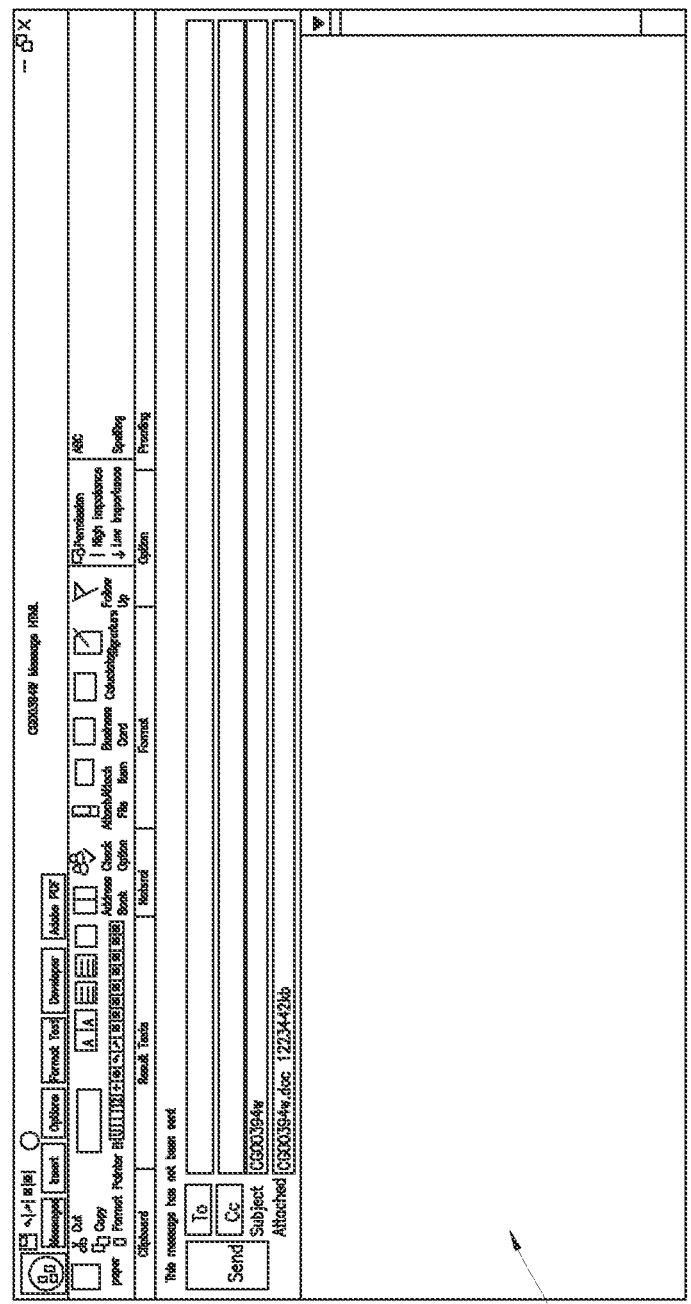
Figure 39:
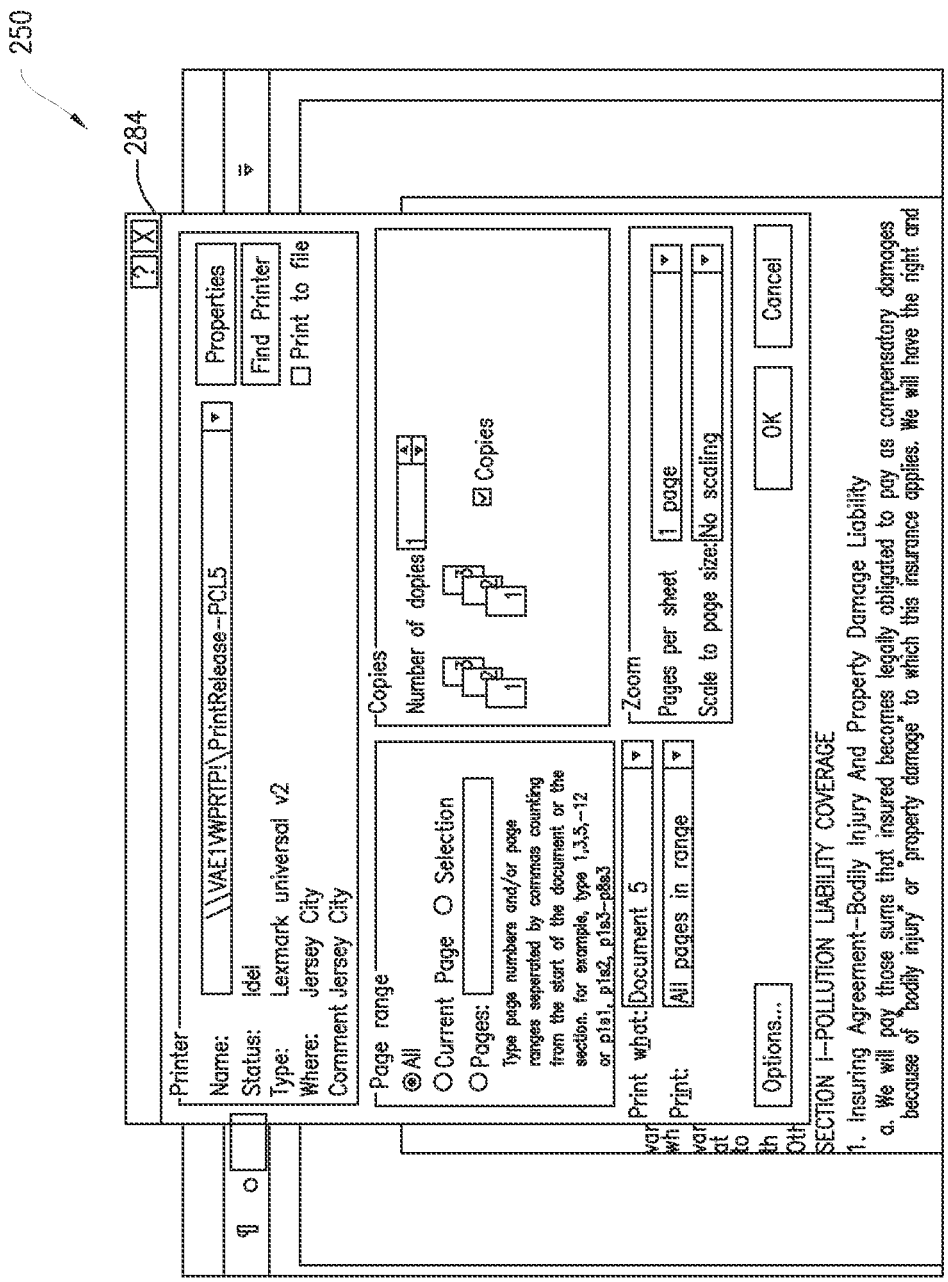

FIG. 37 illustrates a window 280 which allows the user to specify a form name and form title, and to save that information. Further, as shown in FIG. 38, the user can e-mail a form to a desire recipient using an e-mail program 282 (which could be the user's local e-mail program, and/or an e-mail program embedded within the system for allowing e-mail functionality without having to exit the customized forms application of the present disclosure). Moreover, as shown in FIG. 39, the user can print the current form using the print window 284.

Figure 40:
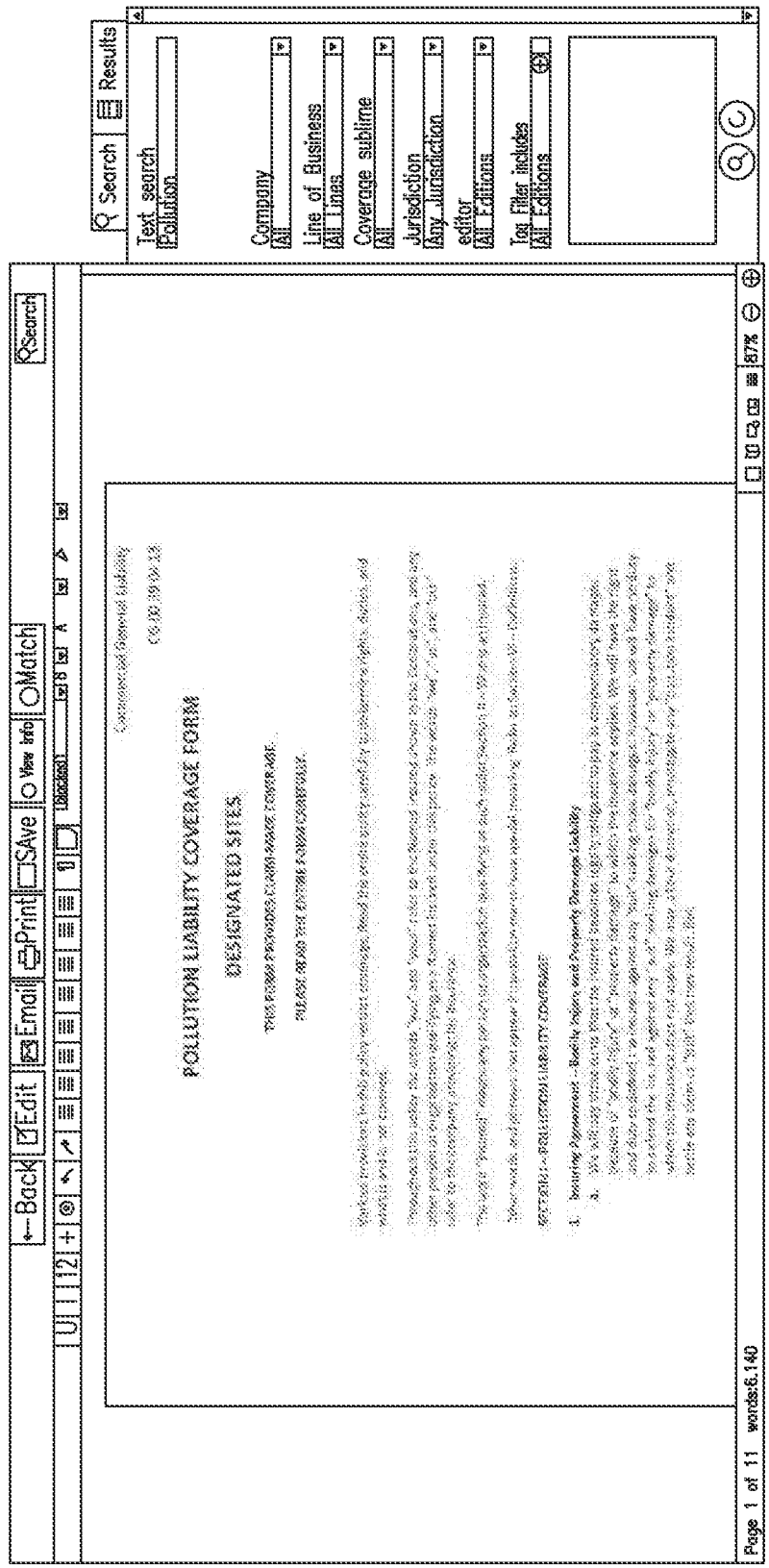
Figure 41:
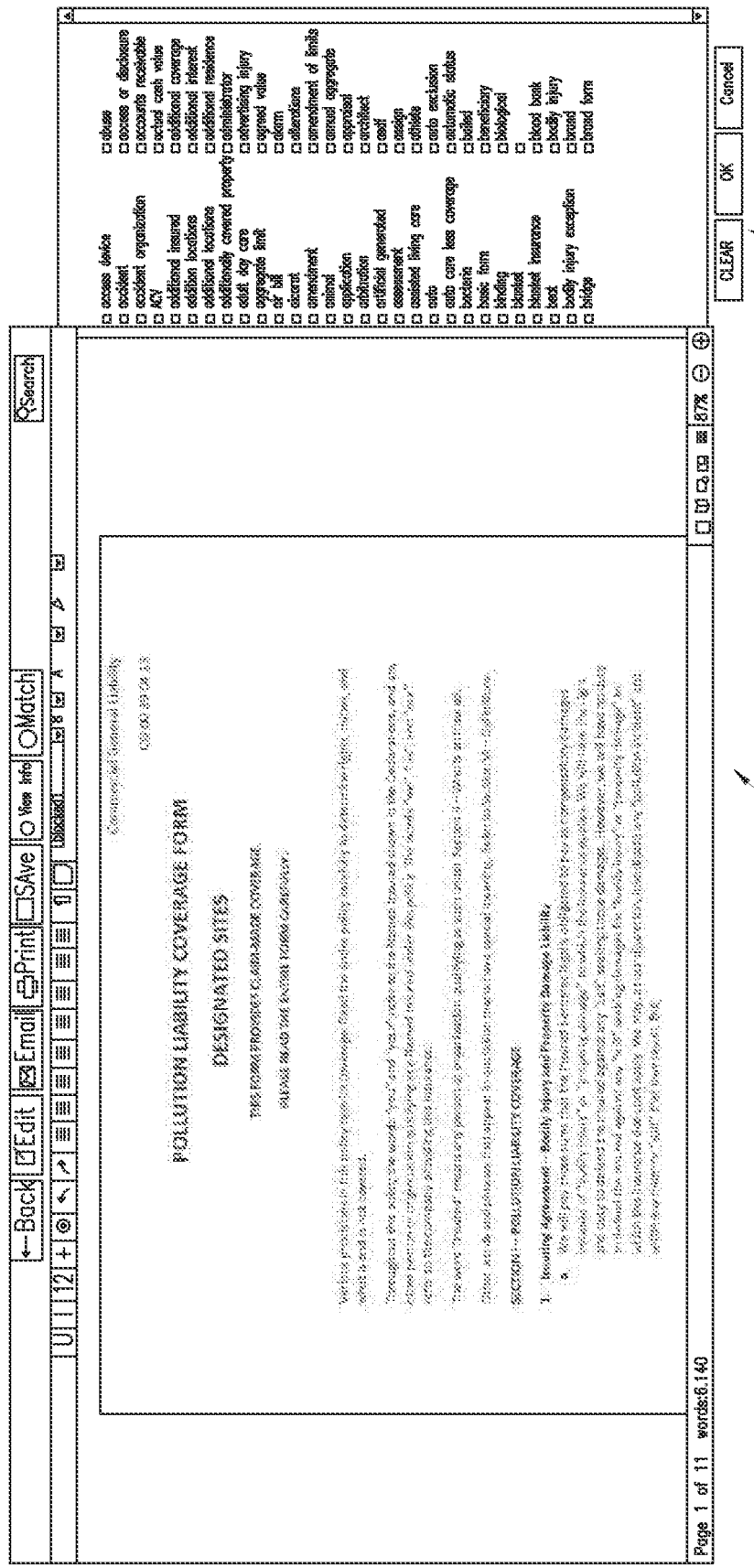
Figure 42:
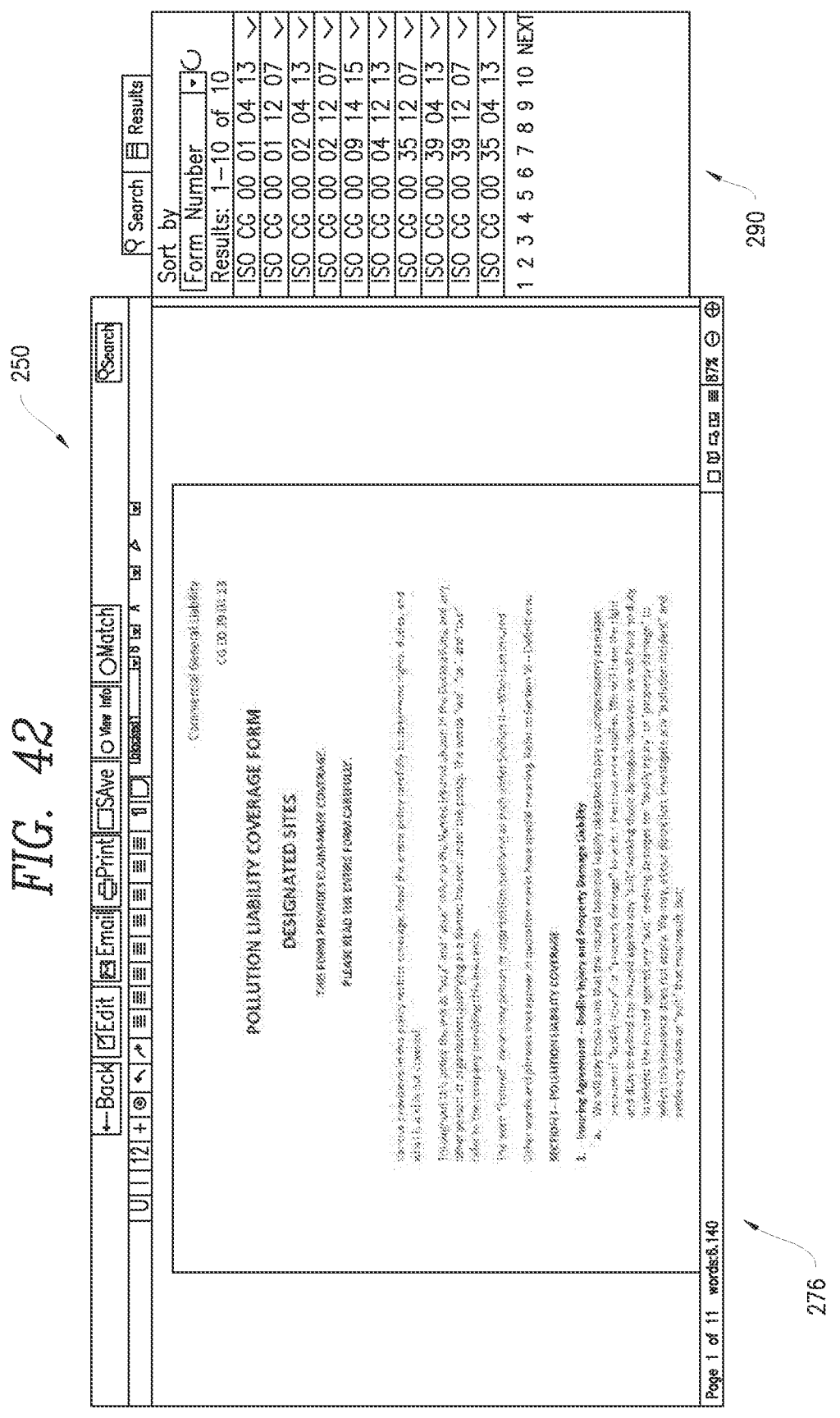

As shown in FIG. 40, the interface 250 also allows the user to perform text searching through other forms, while the user is editing a form in the editor 276, using a text search panel 286. The panel 286 allows for "on-the-fly" searching of other forms by specifying text search strings (keywords), form numbers, company names, lines of business, coverage/sublines, jurisdictions, editions, tag filters, etc., using the controls of the panel 286. For example, while the user is editing a given form (using the editor 276), if the user desires to search for the term "pollution" in other forms, the user can do so using the search panel 286. This allows the user quickly and conveniently locate other forms that have relevant language relating to pollution, and quickly and conveniently access that form (and, perhaps, cut-and-paste language from that form into the form currently being edited in the editor 276), without having to close or exist the form being edited in the editor 276. Similarly, as shown in FIG. 41, the user can search through other forms, while still using the editor 276, by conducting tagged searching using the tagged search panel 288. As shown in FIG. 42, when searching has been conducted using the panels 286 or 288, the results are returned in the panel 290, whereupon the user can click on the desired form(s) in the panel 290 to access them. As shown in FIG. 43, when the desired form has been selected by clicking on a form in the panel 290, it is displayed in window 276. The user can edit that form for any desired purpose, e.g., to cut text from the form for use in another form, etc.

The custom forms generation system of the present disclosure is an innovative product management and development software platform for one or more of a variety of clients (e.g., insurance carriers), enabling such clients to easily research, create and distribute forms (e.g., insurance forms) providing efficiencies in time-to-market, risk reduction, insightful analytics and improved profitability. The clients could provide the system with access to their customer data and content. Accordingly, the system could combine customer content with client content and analytics to create a powerful research, authoring and pricing solution. By incorporating customer forms and content with client forms, information, data analytics and support, the system is uniquely able to provide value to customers throughout the product development process.

The system breaks down (ingests and decomposes) forms into basic core components (e.g., word, paragraph, provision, section, exclusion, etc.) and provides the user with alternatives within a customer's own company library, the client's library, and/or across the market, thereby allowing a user to replace the components and model the changes. The system systematically 'tags' these core components for easy reference later in the life of the component or form to allow faster and more targeted searches across the database. The system could be integrated with other client data, information, and/or systems to model the updated form and perform analytics to determine rating and pricing analytics assumptions based on revised wording. Further, the system could proactively monitor court case rulings and judgments and automatically advise customers when a particular, form, component, and/or language has been involved in a court case. The system could then model the impact of the case on the customer's forms and/or library for overall clams risk and potential profitability impact within the market.

As client content (e.g., revised forms, claims, and/or rating data, etc.) becomes updated, the system could proactively monitor the client's database and proactively predict where customer impacts may be positively or negatively affected. The system's ability to break down forms into their core components and to integrate with the full lifecycle of product development allows for faster and more efficient product development which will allow customers greater and more profitable speed to market. Additionally, the system could include one or more of a variety of functions, including functions related to cloud based storage, search/research, create and edit forms, clause library module, approve and audit forms, reporting, service and technical support tools, user experience, data analytics, "Flesch" reading, and/or integration, etc.

Cloud-based storage functionality could include a public, cloud-based solution to act as a forms library that could facilitate users to store, manage and maintain all personal and commercial lines of business forms (e.g., multistate, interstate, specific state, etc.) including prior versions of the forms, upload and tag a single form, upload and tag forms in batches, allow offline upload/download of forms via import/export of spreadsheets using web interface, enable users to approve and/or edit fields and captured metadata for both single and batch upload of forms offline (via spreadsheet) or online through a table, allow for upload/download of files in Word, PDF, image and RTF (Rich Text Format) formats, allow for rule changes (that are updated overnight, pertaining to client forms) in terms of applicability and status (filed, pended and withdrawn) to be seamlessly integrated with a content manager and TEMIS systems, provide a robust, server-based document upload process that can run without user intervention, automatically restart upon errors, and provide logging and error diagnostics to enable easy troubleshooting of customer formats, etc.

Search/research functionality could include the ability to perform a simple search (e.g., keyword, full text search, etc.) and/or advanced queries and searches on forms including exact, wildcards, boolean, faceted and fuzzy searches, form metadata for search and filters (e.g., form number, form title, line of business (LOB), coverage part, state applicability, form type, coverage, endorsement, declaration, policy writing, schedule, state type (e.g., multistate, limited states or state-specific), status (e.g., active, withdrawn, WIP, template, other), mandatory (e.g., yes or no), admitted (e.g., yes or no), edition (e.g., current, previous, etc.), effective dates (e.g., comparable to forms library), author, industry code, customer-defined custom fields (e.g. program), search on customer notes section, etc.), add industry classification (e.g., SIC, NAICS) code field to forms (e.g., via word add-in), add a maximum of five customer specific metadata fields (e.g. programs), sort search results by columns, add/delete columns and reorganize columns, search based on date fields such as date created, last edit, pended, filed, approved, withdrawn, other, view information and edit information or add proprietary information on specific form (e.g., metadata tags), smart tag by enhancing the tagging logic, rules, scoring by learning from customers (e.g., via surveys, metrics, etc.), include additional tagging search and sort criteria including ranking, scoring, most used, integrate with a third party tagging system for tagging program logic and updated cartridges (e.g., TEMIS), etc.).

"Create and edit forms" functionality could allow for creation and editing of forms (e.g. formatting, text, track changes, revision marks, spell check) through web-based application, Microsoft Word add-in, etc. Such functionality could provide the ability to incorporate style and formatting from client forms template add-in, view forms (e.g., 1 or 2 column, Word, PDF, image (e.g. signature)), match text in forms and perform exact and approximate text searches from one document across library for both client and proprietary forms, add, delete, edit headers and footers, display multiple open documents from within word using a selection option, create a form from a template, create a form from scratch, format forms based on customer settings, maintain version control of forms (e.g., through check in/out function, messaging to users that form is checked out by user name, etc.), global find and replace (e.g., ability to find and replace from one form to multiple forms), etc.

Clause library module functionality could provide a library of standard and alternative clause language in plain English. The module could access a clause library application (e.g., a cloud-based information repository that can be accessed, searched, edited and retrieved directly from Word documents). The module could provide the ability to parse documents, select stored provisions, re-order, number, add in-document navigation, (e.g., outline views, tag/word/paragraph, provisional searches, etc.), prioritize client content then customer content, click on a word/paragraph/provision/section/exclusion and view alternatives by company and match percentage, replace selected word/paragraph/provision/section/exclusion with wording from clause library, add endorsement/exclusion to another form, copy and paste endorsement/exclusion into a document, build a form from scratch by choosing coverage, endorsements, exclusions, store/search for wordings in separate segments/databases (e.g. Language Lab), such as filed wordings, non-filed wordings, program business, etc.

"Approve and audit forms" functionality could maintain a record of user activity on forms to understand authorized user actions and source of language inconsistencies and non-compliance, and could include in-document collaboration (e.g., comments, social elements) to help multiple users to work together on a single document or file to achieve a single final version, save a complete audit trail of form changes right from inception through approval, maintain original and subsequent versions of documents including comments, create filing package capture based on approved forms, etc.

Reporting functionality could provide both standard and custom HTML reports with an ability to export reports in Excel and CSV formats. Such functionality could include in-application, on-demand, and configurable reports from the application (e.g. forms listing with various parameters), upload report (e.g., company, LOB, form number, title, metadata captured on upload, tags) to verify, approve and modify upload of forms, etc., form listing to display the list of forms with status and contains mandatory fields (e.g., company, LOB, form number, title, status (Approved, Filed, WIP, Pending), Date, etc.), filing package report to display the list of forms that are approved and ready for filing and will contain mandatory columns/fields (e.g., Company, LOB, Form #, Title, Approval Status (Submitted, Approved, Rejected), Dates, etc.), tag report to display frequently used tags across forms (e.g., reports with the following Tag: <Tag>), SERFF Report (System for Electronic Rate and Form Filing) to display forms filed with status and dates, forms created report to display the list of forms based on its date of creation and will have mandatory fields e.g., company, LOB, form number, title, author, date created, etc.), forms approved report to display the list of forms based on the date of its approval and the author of the form, which could contain mandatory fields (e.g., company, LOB, form number, title, author, approved date).

Service and technical support tools functionality could include providing features pertaining to service and technical support tools to the service customers and service users. Such features could include an administrator screen to set up, implement, modify, administer and service customers and users (e.g., provide for and display parent-child relationship between companies), customer administrator screen to set up, authorize, modify, administer and service users, add user profiles/role-based access (e.g., individual, group, company), security, administrative functions, underwriter access version (e.g., optional read/write), profile settings, upload, read, write, approve, audit, create reports, add/delete tags, ability to filter customer access by participation, available product and features or modules (e.g., customers participating in one LOB cannot have access to all LOBs, customers signed up for forms only cannot access manual rules, optional features can be turned on/off, optional modules can be turned on/off, capture customer feedback (e.g., surveys, user comments and "Likes")), multi-browser support, no plug-in required (e.g., e-drawing viewer), notification/email that new forms are loaded, training and documentation (e.g., help, how-to videos), in-application alerts and notifications (e.g., system updates, new modules, approvals waiting, new forms added), service and support infrastructure (e.g., service-level agreements (SLAs) for answering customer questions; administrator functions; Tier 1,2,3 escalations), mobile platform support (e.g., application should be engineered so that a mobile version will not require a significant development effort to enable), multi-lingual support (e.g., application should be engineered so that a multi-lingual version will not require a significant development effort to enable).

User experience functionality could include single, any and multi-select options (e.g., by state(s), LOB(s), coverage part(s)), redesigned home page (e.g., create an attractive and informative home page, include an interactive visual workflow with links to key functions including Upload, Search, Create, Approve, File, Communicate, Support (e.g., help, FAQs, product feedback, service support links, email), separate sections for important tasks and reminders, notifications, etc.), redesigned search page (e.g., create an intuitive and simple to use search page, include a search bar on the top and filters along the left pane similar to other familiar search sites (e.g., Amazon, EBay)), branding client (e.g., look and feel, navigation, tabs, text and overall usability).

Data analytics functionality could provide analytics on user, company, cross-companies. Such functionality could include application analytics (e.g., recommend provisions based on market/customers), compare documents (e.g., customer to client, customer to same customer, client to client) to highlight differences, weight consistencies, compare to library, etc., set standard clauses/business rules for new document creation (e.g., upon upload of forms run check against rules/clauses to flag conflicts), set standard clause and compare customer documents to see variances across their portfolio, determine potential impact on customer's forms of client changes (e.g., compare revised forms in client circulars to customer forms to identify what forms may be impacted by the client change), search analytics capture data analytics on forms, tags, searches and other metadata.

Flesch reading functionality incorporates the client Flesch reading capability into the system on form level. The Flesch reading program could be a standalone client application that reads documents and determines the grade-level required of the reader to comprehend the document. Unlike other Flesch reading programs, the client program could follow state regulators guidelines for insurance documents. For instance, certain insurance-specific words terms that are required in the document may be excluded for determining the reading level. In addition, different states have different guidelines which are accounted for in the client Flesch reading program.

Integration functionality could include integration with client systems and/or customer systems. For integration with client systems, the system could include circulars (e.g., one-way integration to provide the system with circular notifications and references including new and pending forms filed by the client), content manager (e.g., two-way integration to feed the system when new forms are added, deleted, updated and for the system to feed content manager tags, wording changes), other client systems may include a "Language Laboratory" for additional real time updates, notifications, and reminders, etc.

For integration with customer computer systems, the system could include "SharePoint" and "Documentum" integration (e.g., provide feature readiness that will perform two-way seamless integration with the existing customer SharePoint and Documentum document management systems to identify, search, tag, match forms, enable editing and support document versioning), cloud system integration (e.g., provide feature readiness that will perform two-way seamless integration with identified external/internal cloud system to identify, search, tag, match forms, enable editing and support document versioning of client forms and content hosted on the cloud), third party integration (e.g., provide feature readiness two-way integration with third parties that are mutually agreed to reduce development effort to enable future like customer or third-party policy administration systems, policy configurators, agency portals and other potential systems), SERFF (System for Electronic Rate and Form Filing) (e.g., provide feature readiness to support two-way integration with Carriers to file and track regulatory approval process).

Figure 44:
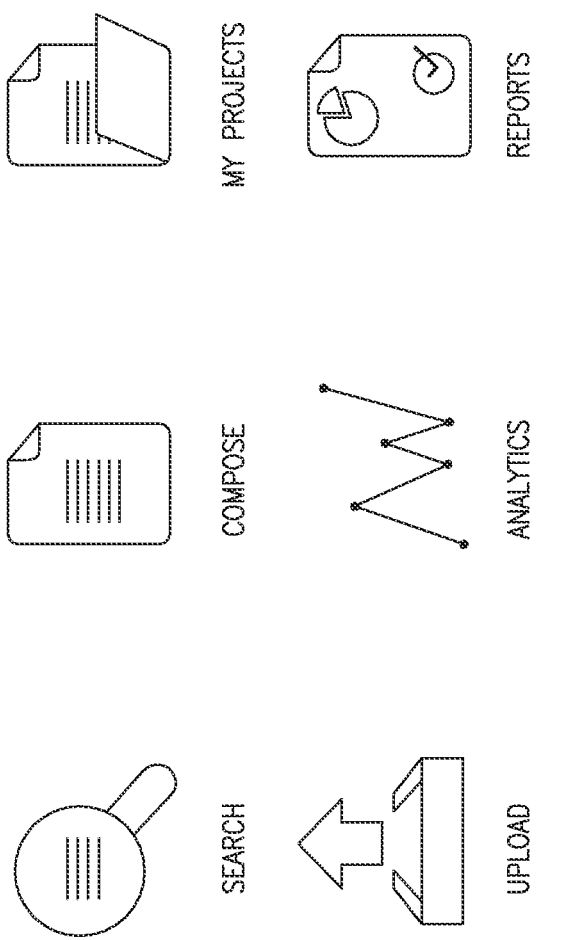

FIGS. 44-56 are additional screenshots illustrating the web-based user interface generated by the system in additional detail. As shown in FIG. 44, the system provides the user with a central, icon-based menu system, wherein the user can choose various functions such as searching for desired forms, composing forms, saving/modifying/accessing forms projects, upload forms to the system (which can be ingested and decomposed by the system as disclosed herein), performing analytics on forms, and generating reports.

Figure 45:
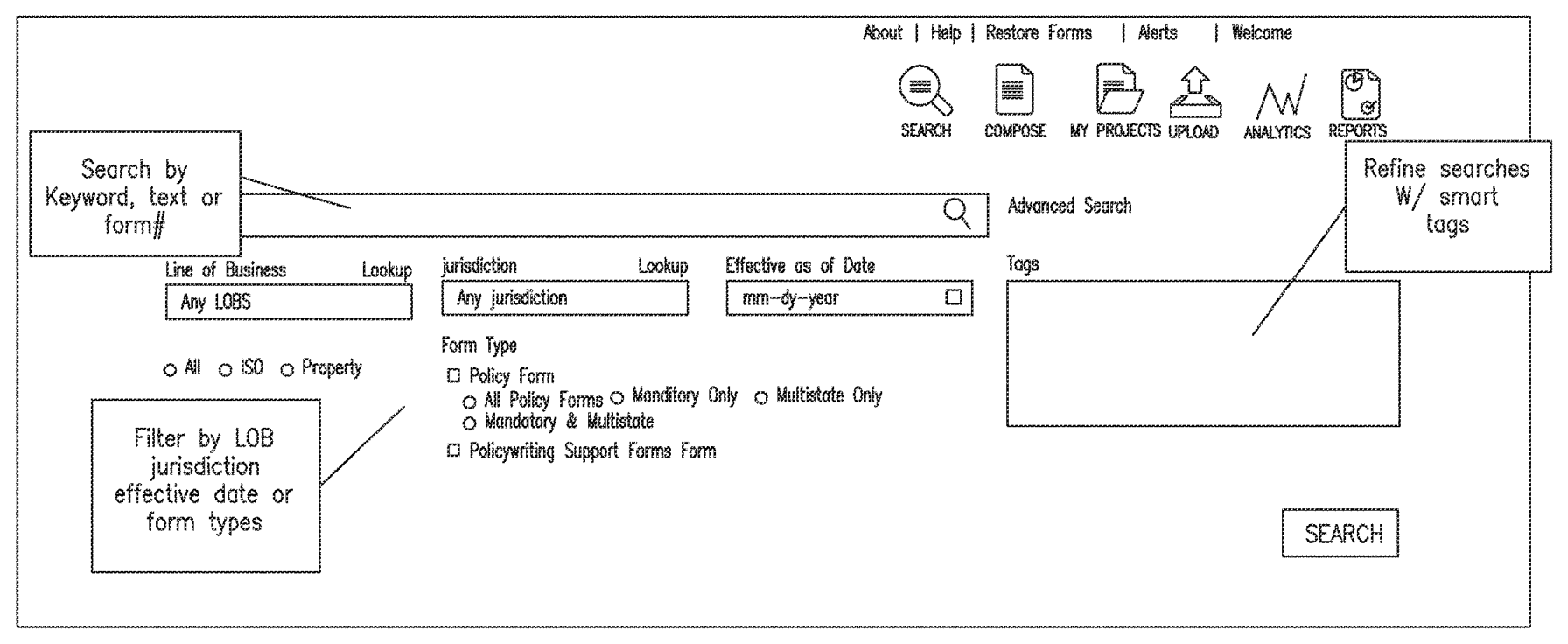
Figure 46:
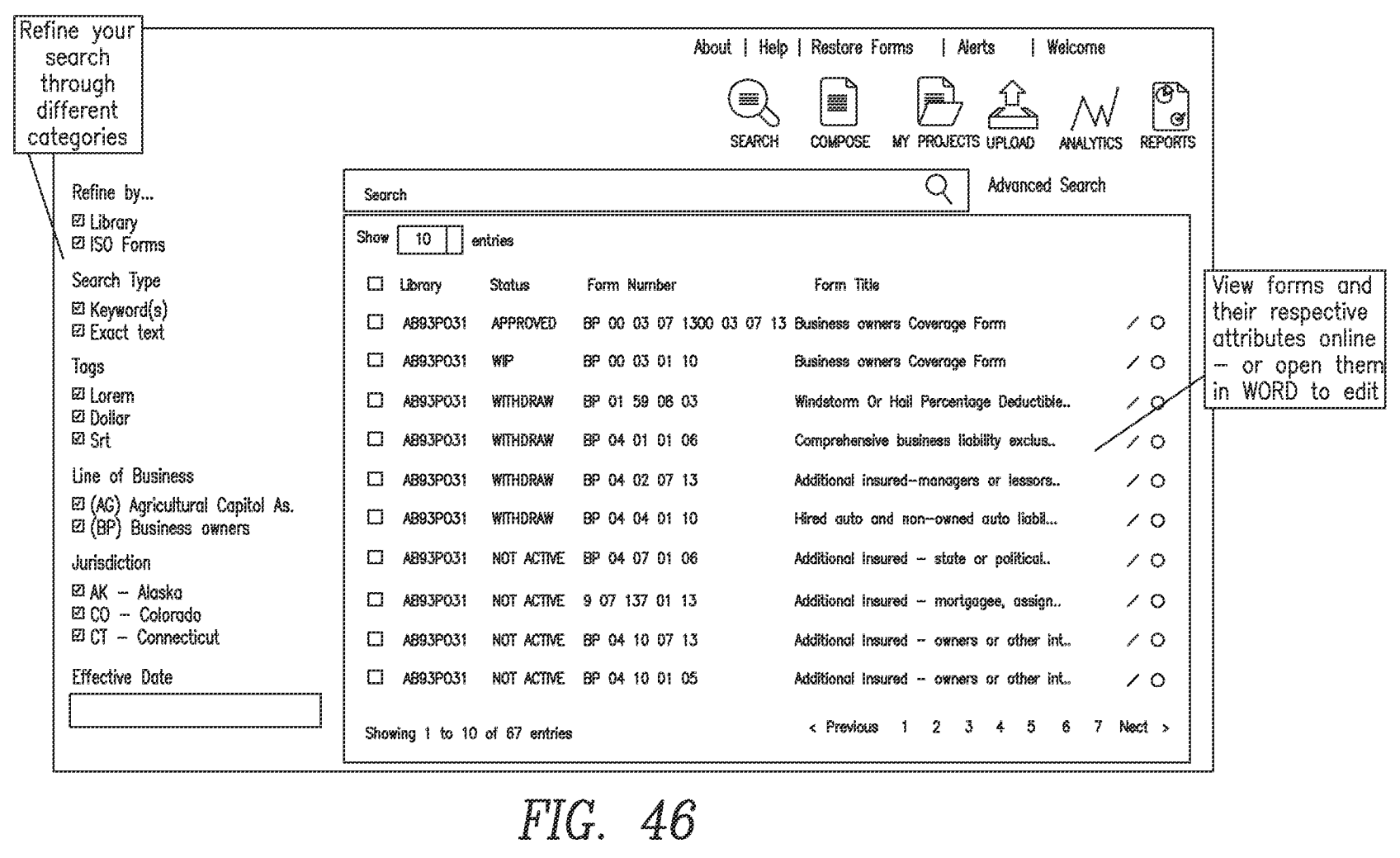
Figure 47:
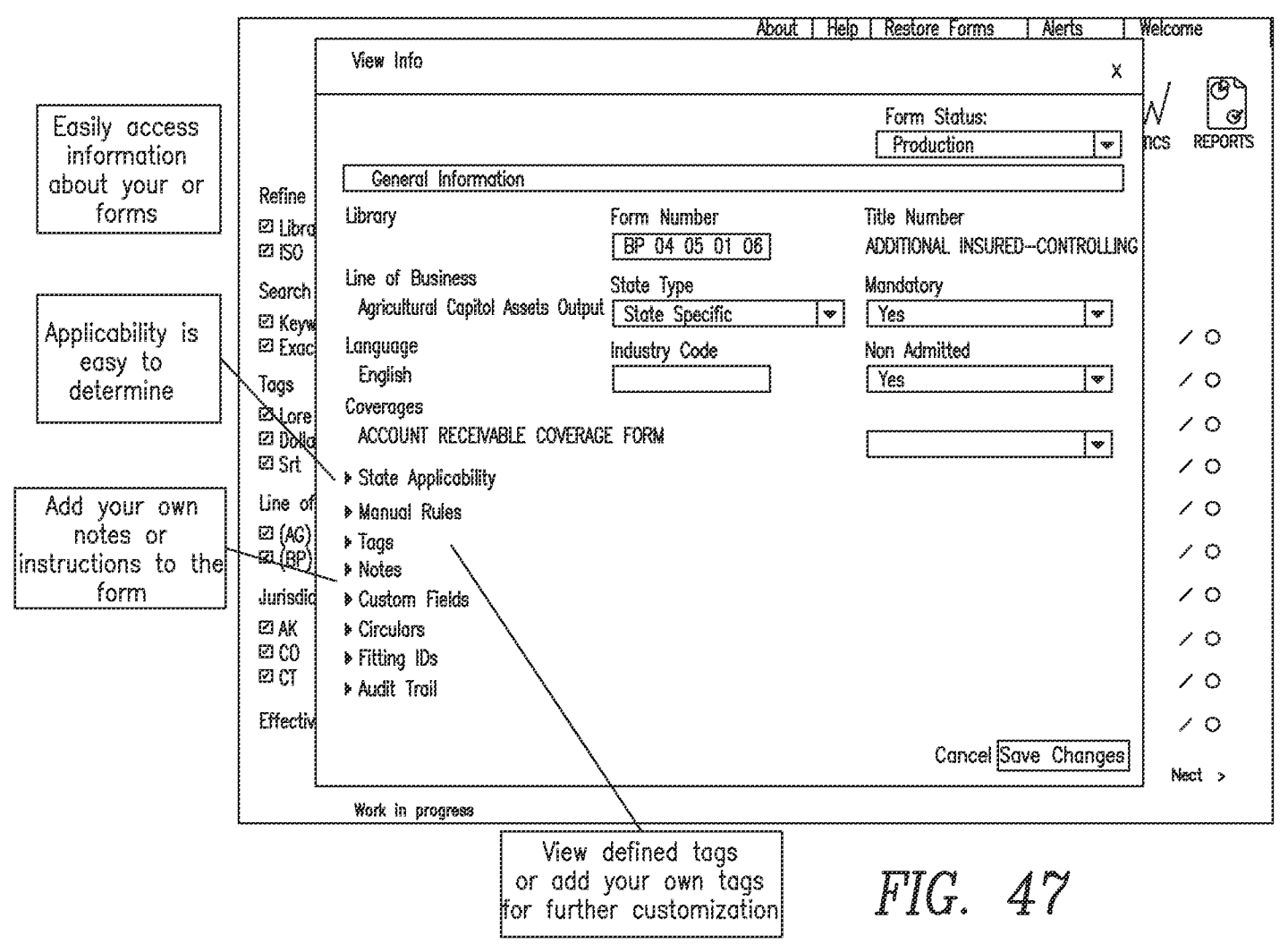

As shown in FIG. 45, the user interface allows users to search by keywords, text, or form numbers for particular forms, refine searches using smart tags, and filter by line of business (LOB), jurisdiction, effective dates, or form types. As shown in FIG. 46, the user interface allows the user to refine a search through different categories, as well as view forms and their respective attributes online or open the forms in a word processor (e.g., Microsoft WORD) for editing. As shown in FIG. 47, the user interface allows the user to easily access information about one or more forms, identify applicability of the form (e.g., state applicability, manual rules, tags, notes, etc.), add customized notes or instructions to the form, and/or view defined tags (or add customized tags).

Figure 48:
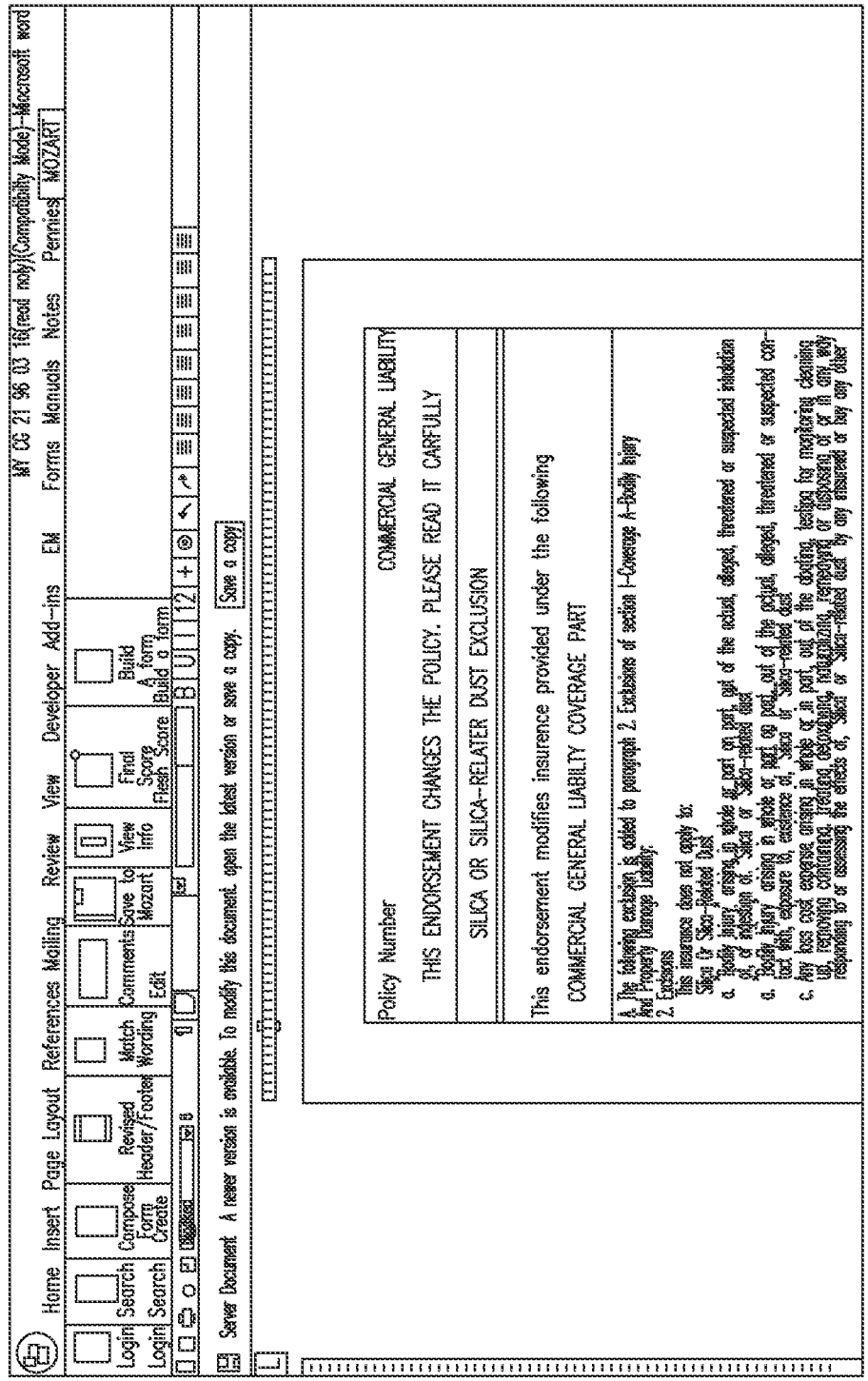
Figure 49:
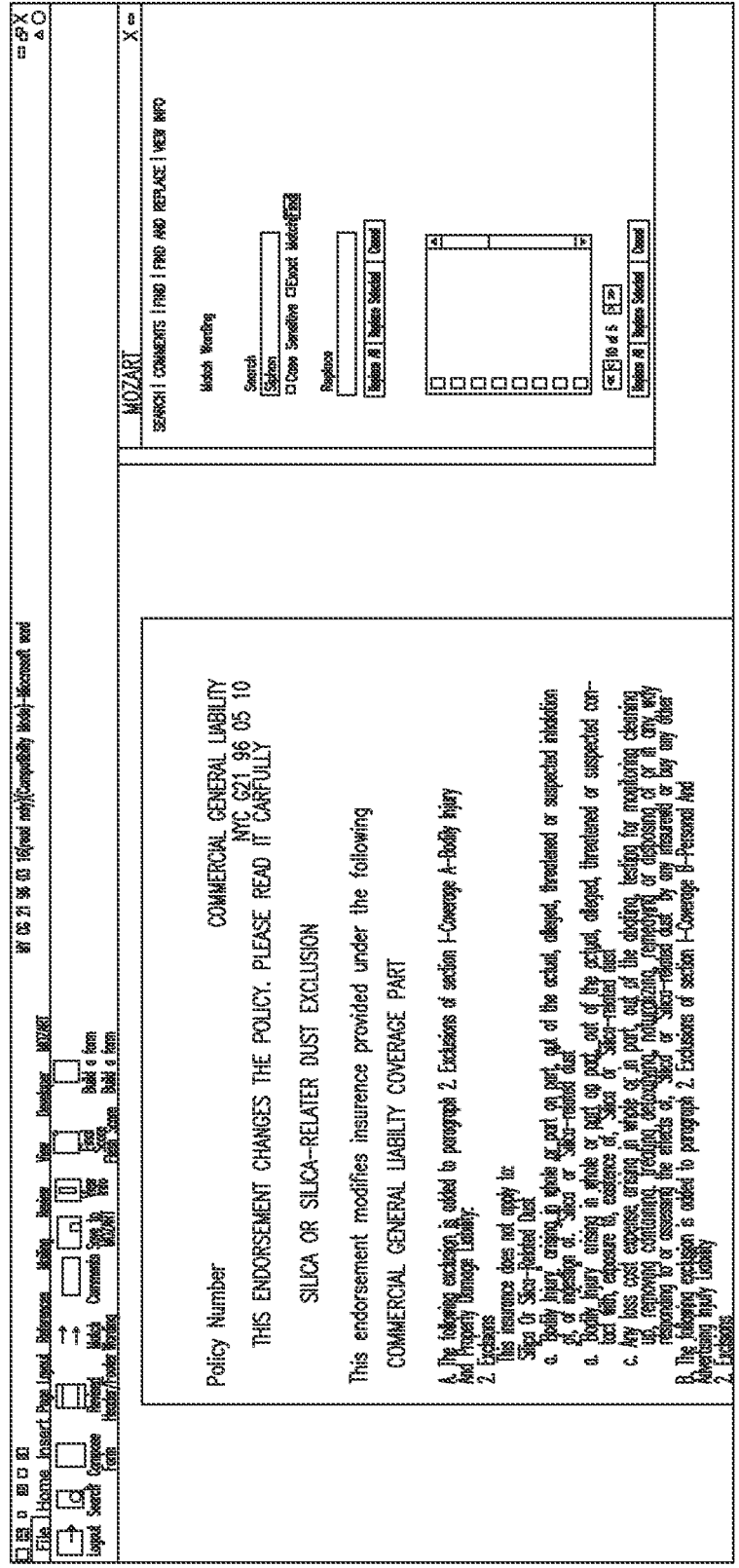
Figure 50:
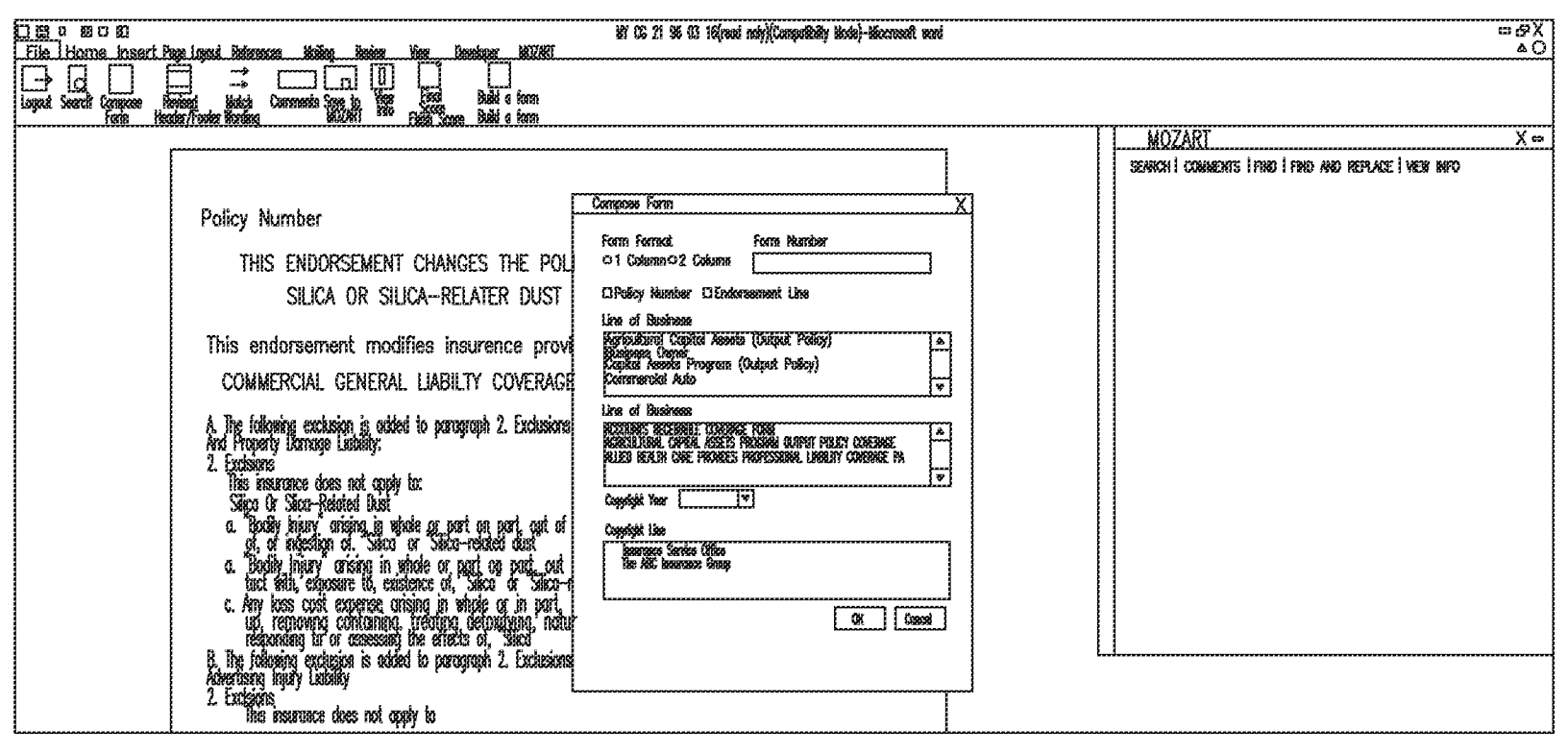

As shown in FIG. 48, the system could be provided in the form of a software "plugin" into an existing word processor, such as Microsoft WORD. In such circumstances, the functionality provided by the system is accessible in the word processor using one or more customized tabs, toolbars, and/or other GUI controls. A sample form is shown in FIG. 48. As shown in FIG. 49, the word processor plugin displays a separate panel to the right of the document, which allows the user to search for desired forms and/or clauses, add comments, and perform other functions. As shown in FIG. 50, the plugin can generate a dialog box in the user interface which allows the user to compose/define attributes associated with the form, such as format, form number, policy number, endorsement line, line of business, coverages, copyright year, copyright line, etc.

Figure 51:
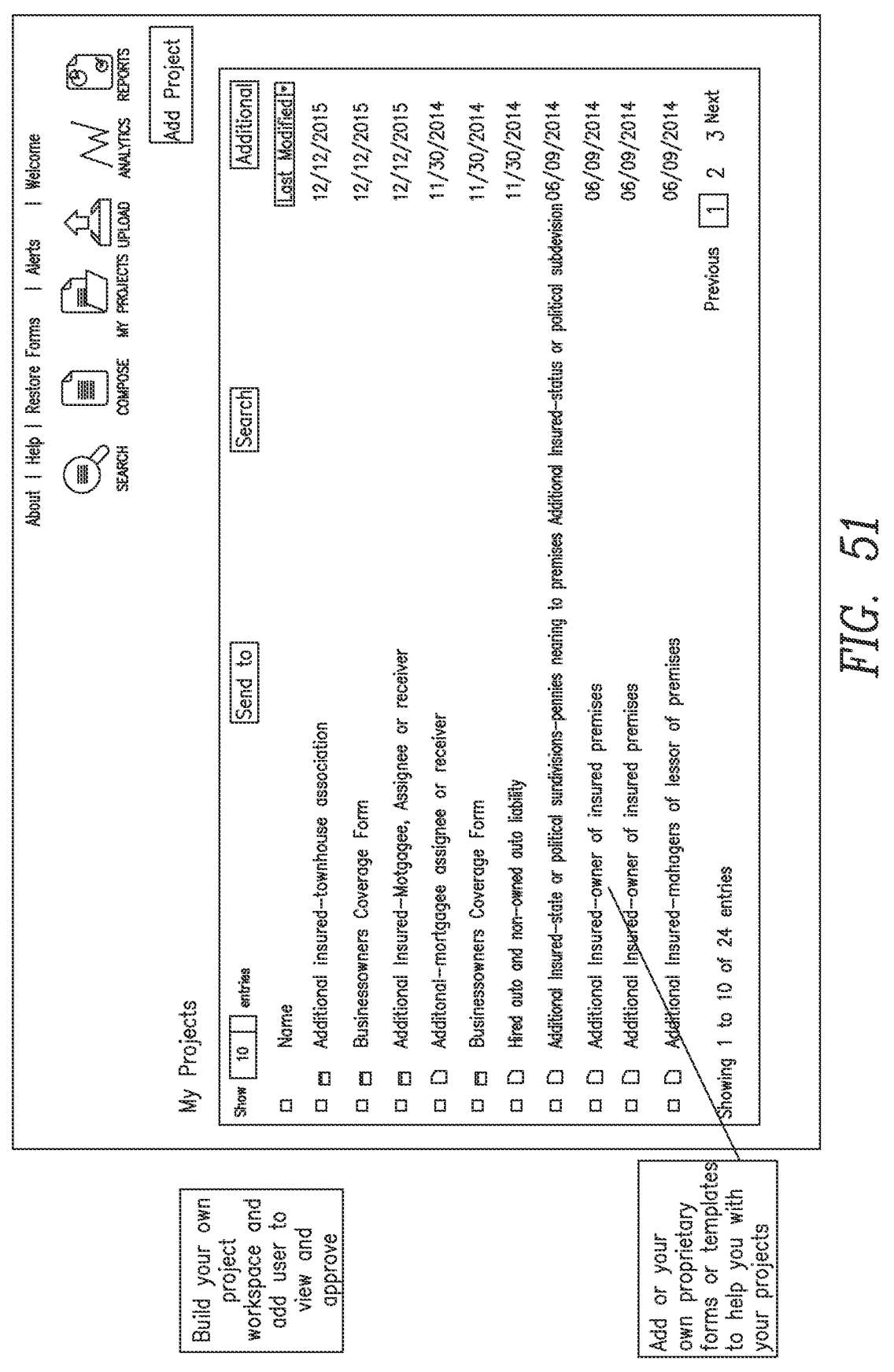
Figure 52:
Figure 54:
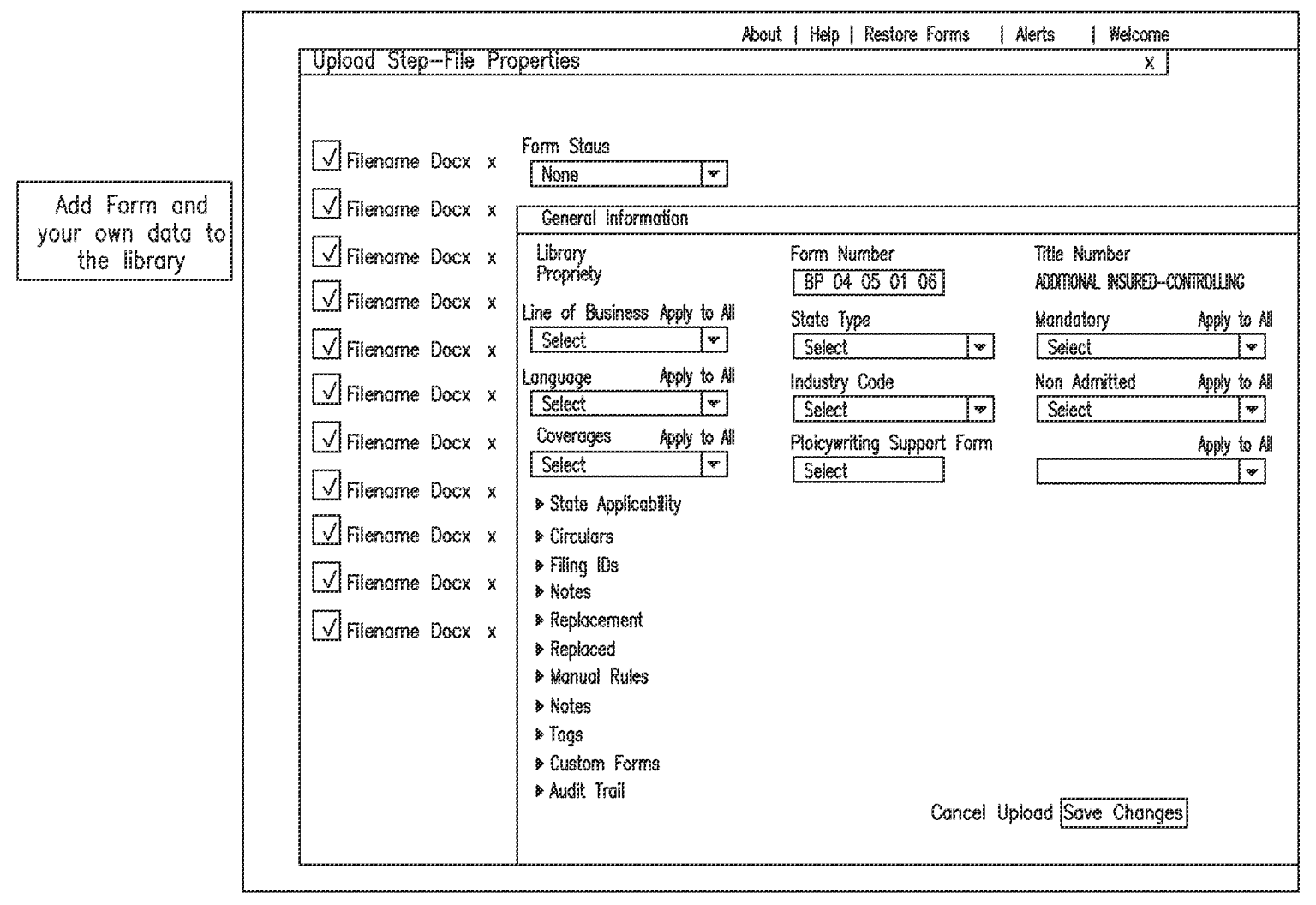

As shown in FIG. 51, the user interface allows the user to build customized form project workspaces, control user access to such workspaces (e.g., add or remove users, approve users, etc.), as well as add proprietary forms to such projects, add templates, etc. As shown in FIG. 52, the user could create and configure desired reports. As shown in FIG. 53, the user interface allows the user to view a report and/or export it into a different file format, such as PDF or Microsoft EXCEL. As shown in FIG. 54, the user interface allows a user to add forms and/or data to a library of forms (e.g., to the database). As shown in FIG. 55, the user can receive various alerts and/or notifications in the user interface from various users, such as administrators, peers, approvers, etc. Finally, as shown in FIG. 56, the user interface allows the user to send and receive feedback on questions, suggestions, etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for creating customized insurance forms, comprising:
 a computer system having a memory, a processor, and a user interface; and
 a custom forms software application stored in the memory and executed by the processor, the custom forms software application including:
  a form search module retrieving at least one pre-defined form from a database and displaying the form to the user via the user interface;
  a form editor module for allowing the user to edit the pre-defined form using the user interface; and
  a clause searching/filtering module allowing the user to locate one or more desired clauses from the database and allowing the user to insert the one or more desired clauses into the pre-defined form in order to create a customized insurance form,
 wherein the custom forms software application integrates in two-way communication and operation with one or more of a customer computer system, a document management system, or a cloud computing system; ingests a plurality of insurance-related forms obtained from the one or more of the customer computer system, the document management system, or the cloud computing system; decomposes the plurality of insurance-related forms into a plurality of clauses; applies a search tag to each of the plurality of clauses; and stores the plurality of clauses and the search tags in the database, and
 wherein the custom forms software application includes a content manager for automatically feeding content manager tags when a form has been added, deleted, or updated on the one or more of the customer computer system, the document management system, or the cloud computing system for tagging of the form.

2. The system of claim 1, wherein the clause searching/filtering module searches for desired clauses from the database using the search tags.

3. The system of claim 1, wherein the system monitors for a change made by the user to one or more forms stored in the database.

4. The system of claim 3, wherein the system identifies one or more additional forms that are related to the one or more forms changed by the user.

5. The system of claim 4, wherein the system generates an alert if the change made by the user impacts the one or more additional forms, and transmits the alert to the user.

6. The system of claim 1, wherein the system displays the pre-defined form in a first display portion of the user interface, and displays the one or more desired clauses in a second display portion of the user interface.

7. The system of claim 6, wherein the user can click on one of the one or more desired clauses in the second display portion to cause the one of the one or more displayed clauses to be inserted into the pre-defined form at a desired location of the pre-defined form.

8. The system of claim 1, wherein the system automatically recommends a clause stored in the database for insertion into the pre-defined form.

9. A method for creating a customized insurance form, comprising the steps of:
 electronically receiving at a computer system a plurality of insurance-related forms from one or more of a customer computer system, a document management system, or a cloud computing system in communication with the computer system;
 providing two-way integration and operation with one or more of the customer computer system, the document management system, or the cloud computing system;
 ingesting and decomposing each of the plurality of insurance-related forms into a plurality of clauses using the software application executing on the computer system;
 electronically applying a search tag to each of the plurality of clauses;
 storing the plurality of clauses and the tags in a database;
 allowing the user to search for and load into the computer system a pre-defined insurance form;
 allowing the user to search for one or more desired clause from the plurality of clauses in the database;
 displaying the one or more desired clauses at the computer system;
 allowing the user to edit the pre-defined insurance form into a customized insurance form by electronically inserting the one or more desired clauses into the pre-defined insurance form; and
 automatically feeding content manager tags when a form has been added, deleted, or updated on the one or more of the customer computer system, the document management system, or the cloud computing system for tagging of the form.

10. The method of claim 9, further comprising searching for the one or more desired clauses from the database using the search tags.

11. The method of claim 9, further comprising automatically monitoring for a change made by the user to one or more forms stored in the database.

12. The method of claim 11, further comprising automatically identifying by the computer system one or more additional forms that are related to the one or more forms changed by the user.

13. The method of claim 12, further comprising automatically generating by the computer system an alert if the change made by the user impacts the one or more additional forms, and transmitting the alert to the user.

14. The method of claim 9, further comprising displaying by the computer system the pre-defined form in a first display portion of a user interface, and displaying the one or more desired clauses in a second display portion of the user interface.

15. The method of claim 14, further comprising allowing the user to click on one of the one or more desired clauses in the second display portion to cause the one of the one or more displayed clauses to be inserted into the pre-defined form at a desired location of the pre-defined form.

16. The method of claim 9, further comprising automatically recommending a clause stored in the database for insertion into the pre-defined form.

17. A non-transitory, computer-readable medium having instructions stored thereon which, when executed by a computer system, cause the computer system to execute steps for creating a customized insurance form, the steps comprising:
- electronically receiving at a computer system a plurality of insurance-related forms from one or more of a customer computer system, a document management system, or a cloud computing system in communication with the computer system;
- providing two-way integration and operation with one or more of the customer computer system, the document management system, or the cloud computing system;
- ingesting and decomposing each of the plurality of insurance-related forms into a plurality of clauses using the software application executing on the computer system;
- electronically applying a search tag to each of the plurality of clauses;
- storing the plurality of clauses and the tags in a database;
- allowing the user to search for and load into the computer system a pre-defined insurance form;
- allowing the user to search for one or more desired clause from the plurality of clauses in the database;
- displaying the one or more desired clauses at the computer system;
- allowing the user to edit the pre-defined insurance form into a customized insurance form by electronically inserting the one or more desired clauses into the pre-defined insurance form; and
- automatically feeding content manager tags when a form has been added, deleted, or updated on the one or more of the customer computer system, the document management system, or the cloud computing system for tagging of the form.

18. The computer-readable medium of claim 17, further instructions for searching for the one or more desired clauses from the database using the search tags.

19. The computer-readable medium of claim 17, further comprising instructions for automatically monitoring for a change made by the user to one or more forms stored in the database.

20. The computer-readable medium of claim 19, further comprising instructions for automatically identifying by the computer system one or more additional forms that are related to the one or more forms changed by the user.

21. The computer-readable medium of claim 20, further comprising instructions for automatically generating by the computer system an alert if the change made by the user impacts the one or more additional forms, and transmitting the alert to the user.

22. The computer-readable medium of claim 17, further comprising instructions displaying by the computer system the pre-defined form in a first display portion of a user interface, and displaying the one or more desired clauses in a second display portion of the user interface.

23. The computer-readable medium of claim 22, further comprising instructions for allowing the user to click on one of the one or more desired clauses in the second display portion to cause the one of the one or more displayed clauses to be inserted into the pre-defined form at a desired location of the pre-defined form.

24. The computer-readable medium of claim 17, further comprising instructions for automatically recommending a clause stored in the database for insertion into the pre-defined form.

* * * * *